(12) United States Patent
Gallagher-Gruber et al.

(10) Patent No.: US 11,079,585 B2
(45) Date of Patent: Aug. 3, 2021

(54) SYSTEM AND METHOD FOR PERFORMING AUTOMATED ANALYSIS OF AIR SAMPLES

(71) Applicant: FIRST FRONTIER PTY LTD, Seacliff SA (AU)

(72) Inventors: Jordan Gallagher-Gruber, Seacliff SA (AU); Gabor Szijarto, Budapest (HU)

(73) Assignee: First Frontier Pty Ltd, Seacliff South Australia (AU)

(*) Notice: Subject to any disclaimer, the term of this patent is extended or adjusted under 35 U.S.C. 154(b) by 284 days.

(21) Appl. No.: 16/343,291

(22) PCT Filed: Oct. 20, 2017

(86) PCT No.: PCT/AU2017/000227
§ 371 (c)(1),
(2) Date: Apr. 18, 2019

(87) PCT Pub. No.: WO2018/071958
PCT Pub. Date: Apr. 26, 2018

(65) Prior Publication Data
US 2019/0258046 A1    Aug. 22, 2019

(30) Foreign Application Priority Data

Oct. 21, 2016 (AU) ................................ 2016904291

(51) Int. Cl.
  *G02B 21/36* (2006.01)
  *G01N 15/06* (2006.01)
  *G01N 15/00* (2006.01)

(52) U.S. Cl.
  CPC ....... *G02B 21/361* (2013.01); *G01N 15/0625* (2013.01); *G02B 21/36* (2013.01); *G02B 21/365* (2013.01); *G01N 2015/0046* (2013.01)

(58) Field of Classification Search
  CPC .... G02B 21/361; G02B 21/36; G02B 21/365; G01N 2015/0046; G01N 15/0625
  See application file for complete search history.

(56) References Cited

U.S. PATENT DOCUMENTS

| | | | |
|---|---|---|---|
| 3,692,412 A * | 9/1972 | Chubb | G01N 15/0205 356/338 |
| 4,618,938 A | 10/1986 | Sandland et al. | |
| 4,940,327 A * | 7/1990 | Lilienfeld | G01N 15/0205 356/338 |
| 5,205,155 A | 4/1993 | Cooper | |

(Continued)

FOREIGN PATENT DOCUMENTS

| EP | 1184659 | 3/2002 |
|---|---|---|
| EP | 1986155 | 10/2008 |

(Continued)

OTHER PUBLICATIONS

Landsmeer et al. "Detection of pollen grains in multifocal optical microscopy images of air samples," Microsc. Res. Tech., 2009, vol. 72, No. 6, pp. 424-430 (Abstract Only).

(Continued)

Primary Examiner — Que Tan Le
Assistant Examiner — Don J Williams
(74) Attorney, Agent, or Firm — Sheridan Ross P.C.

(57) ABSTRACT

A system and method for automated analysis of a membrane filter obtained from an air quality monitoring apparatus used for sampling airborne respirable fibres such as asbestos and synthetic mineral fibres is described. The system comprises capturing a macroscale image a membrane filter and analysing macroscale image using a computer vision method to determine a countable area of the membrane filter and one or more excluded regions within the countable area of the membrane filter. These excluded regions comprise membrane filter grid lines, air bubbles and large particulate matter. The slide is then placed on a robotic XY stage of a digital phase contrast microscope which is used to capture at least one magnified phase contrast image at each of 20 or (Continued)

more sample locations located across the filter member. The sample locations are selected such that a field of view at each sample location does not contain an excluded region. The magnified phase contrast images are analysed using a computer vision method to identify and count the number of fibres in the field of view, and the total number of fibres is then reported.

26 Claims, 11 Drawing Sheets

(56) References Cited

U.S. PATENT DOCUMENTS

| | | | |
|---|---|---|---|
| 5,566,249 | A | 10/1996 | Rosenlof et al. |
| 7,418,118 | B2 | 8/2008 | Furnas et al. |
| 8,250,021 | B2 | 8/2012 | Roth |
| 8,254,696 | B2 | 8/2012 | Matteoni et al. |
| 8,331,620 | B2 | 12/2012 | Branham et al. |
| 9,917,112 | B2 | 3/2018 | Yamazaki et al. |
| 2005/0111086 | A1 | 5/2005 | Knoblich et al. |
| 2005/0251347 | A1 | 11/2005 | Perona et al. |
| 2008/0267469 | A1 | 10/2008 | Kawabata et al. |
| 2017/0227430 | A1 | 8/2017 | Marini et al. |

FOREIGN PATENT DOCUMENTS

| | | |
|---|---|---|
| JP | 2007-218641 | 8/2007 |
| KR | 2012-0075836 | 7/2012 |
| KR | 2012-0129383 | 11/2012 |

OTHER PUBLICATIONS

International Search Report prepared by the Australian Patent Office dated Dec. 19, 2017, for International Application No. PCT/AU2017/000227.
Written Opinion prepared by the Australian Patent Office dated Dec. 19, 2017, for International Application No. PCT/AU2017/000227.
"Clemex Vision PE," Clemex Technologies Inc., Jun. 2015, 16 pages.
"Guidance Note on the Membrane Filter Method for Estimating Airborne Asbestos Fibres," Commonwealth of Australia, Apr. 2005, 2nd. Edition, 75 pages.
Boucher et al. "Development of a semi-automatic system for pollen recognition," Aerobiologia, 2002, vol. 18, pp. 195-201 (Abstract only).
Ishizu et al. "Image Processing of Particle Detection for Asbestos Qualitative Analysis Support Method," 10th International Conference on Control, Automation, Robotics and Vision, Dec. 17-20, 2008, Hanoi, Vietnam, 7 pages.
Ishizu et al. "Automatic Counting Robot Development Supporting Qualitative Asbestos Analysis—Asbestos, Air Bubbles, and Particles Classification Using Machine Learning," Journal of Robotics and Mechatronics, Apr. 2010, vol. 22, No. 4, pp. 506-513.
Wienke et al. "An adaptive resonance theory based artificial neural network (ART-2a) for rapid identification of airborne particle shapes from their scanning electron microscopy images," Chemometrics and Intelligent Laboratory Systems, Nov. 1994, vol. 25, No. 2, pp. 367-387 (Abstract only).

* cited by examiner

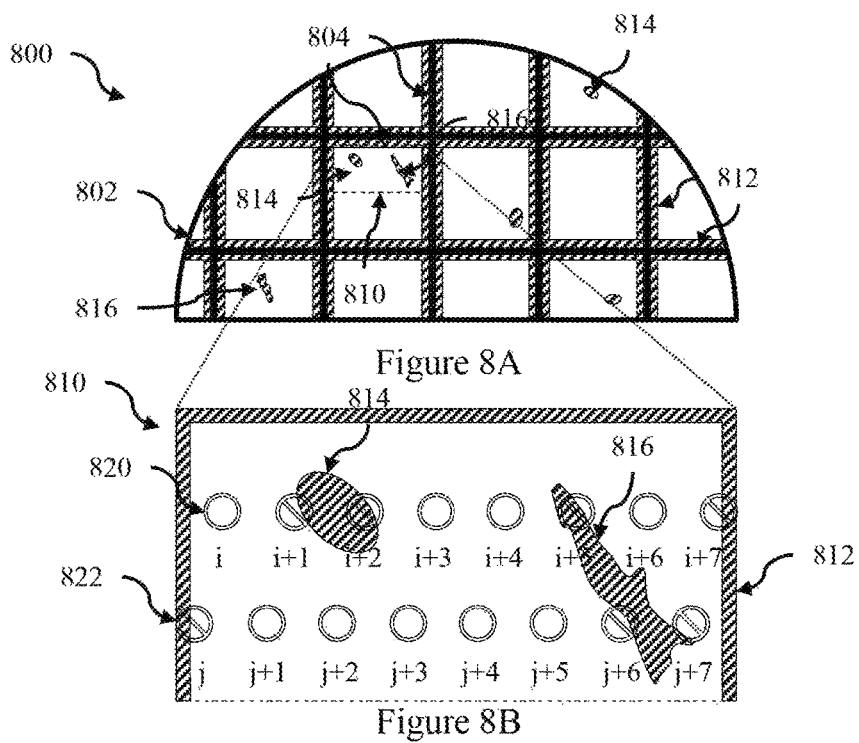
Figure 8A
Figure 8B
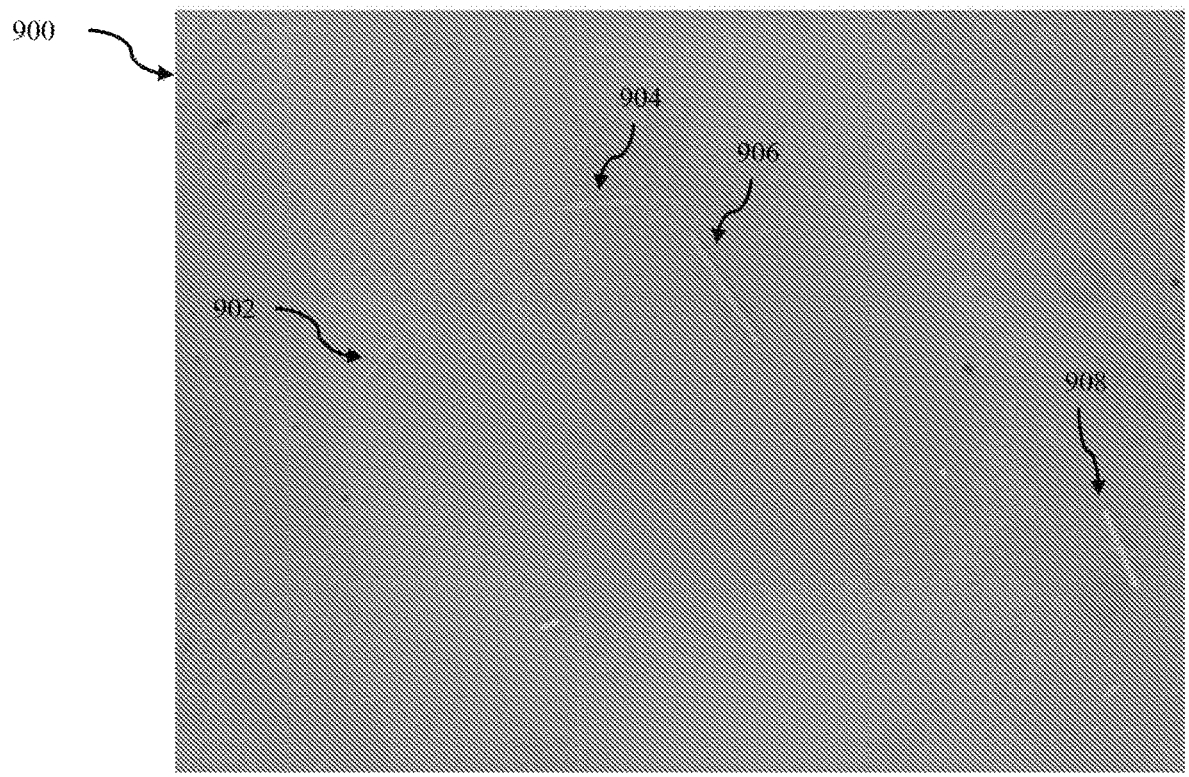
Figure 9

_US 11,079,585 B2_

SYSTEM AND METHOD FOR PERFORMING AUTOMATED ANALYSIS OF AIR SAMPLES

CROSS-REFERENCE TO RELATED APPLICATIONS

This application is a national stage application under 35 U.S.C. 371 and claims the benefit of PCT Application No. PCT/AU2017/000227 having an international filing date of 20 Oct. 2017, which designated the U.S., which PCT application claimed the benefit of Australian Provisional Patent Application No. 2016904291 titled "SYSTEM AND METHOD FOR PERFORMING AUTOMATED ANALYSIS OF AIR SAMPLES" and filed on 21 Oct. 2016, the disclosure of each of which are incorporated herein by reference.

TECHNICAL FIELD

The present disclosure relates to monitoring air quality. In a particular form the present disclosure relates to automated systems for analysing air samples for the presence of respirable fibres such as asbestos fibres or synthetic mineral fibres (SMF).

BACKGROUND

Airborne respirable fibres, such as asbestos or synthetic mineral fibres (SMF) represent a health hazard and Occupational Health and Safety guidelines and or laws often require air quality monitoring apparatus to be installed near locations where fibres may be present. These air quality monitoring apparatus comprise a pumping system which draws air through a filter at a specified flow rate, and after sampling the air for respirable fibres such as asbestos fibres, the filter can be removed and sent off to a laboratory for conversion to a membrane filter for counting of asbestos fibres. Typically the filters are mixed cellulose ester (MCE) filters with a pore size of around 0.8 micrometres. In Australia, the currently accepted and recommended method for analysis of membrane filters for sampling asbestos fibres is known as the Membrane Filter Method (MFM). The membrane filter method was first developed by the Australian National Health and Medical Research Council in 1976. A guidance note was issued in 1988 and was updated again 2005 by the National Occupational Health and Safety Council (NOHSC) and published as a "Guidance Note on the Membrane Filter Method for Estimating Airborne Asbestos Fibres [NOHSC: 3003 (2005)]". This guidance note defines the sample collection methodology, details of the membrane filter method and reporting requirements, and the entire content of this guidance note is hereby incorporated by reference. Similar reference documents or guidance notes exist in other jurisdictions, such as OHSA 1994 note: 29 CFR 1910.1001b Occupational safety and health standards: detailed procedure for asbestos sampling and analysis—Non-Mandatory. Washington, D.C.: U.S. Department of Labor, Occupational Safety and Health Administration.

As stated in the guidance note, the MFM is used to assist in monitoring the effectiveness of control measures for preventing exposure to airborne asbestos fibres, and in determining worker exposure to airborne asbestos fibres. The membrane filter method requires a skilled operator to manually review a large number (e.g. 100) graticule areas (points) over the membrane filter through a phase contrast microscope and count the number of countable respirable fibres in the graticule field of view. Counting requires the operator to match a fibre to a published reference shape, and they must exclude counting in locations where membrane filter grid lines, air bubbles and large particulate matter are within the graticule field of view or close to the graticule field of view, as air-bubbles can cause a wash effect where fibres are pushed to the edges of the bubble. The operator counts "countable respirable fibres" which are those fibres which match a published reference shape (e.g. the Guidance Note). That is a countable fibre is one that fits the geometric requirements defined by the Guidance Note (or similar reference). According to this definition, almost all asbestos fibres are countable respirable fibres, but it must be noted that not all countable respirable fibres are necessarily asbestos fibres. Despite this, the number of countable respirable fibres is used as a measure (or proxy) of the number of asbestos fibres in the air sample. As noted in the Guidance Note "experience has shown that this method does not always produce comparable results when used by different laboratories and by different workers. Differences can arise due to variations in sampling, preparation of the slide, optical counting, the calculation of the results and other influencing factors. Inter-laboratory comparisons of dust measurements are feasible only if agreement can be reached concerning all details of the method". Thus whilst the membrane filter method is still the recommended method for measuring airborne asbestos fibres, it remains both a time consuming and subjective measurement. Further the validity of the method relies upon the operator to strictly adhere to the guidelines and diligently identifying regions to be excluded, and correctly identify and count fibres over the full surface of the membrane filter. When operators are under time or cost pressures there remains the risk that strict adherence to the guidelines may be sacrificed, and thus safety and reliability of the membrane filter method is compromised.

There is thus a need to provide improved systems and methods for analysing a membrane filter obtained from an air quality monitoring apparatus for measuring airborne asbestos fibre, or to at least provide a useful alternative to existing systems and methods.

SUMMARY

According to a first aspect, there is provided a method for automated analysis of a membrane filter obtained from an air quality monitoring apparatus used for sampling airborne respirable fibres, the method comprising capturing at least one macroscale image of at least a sample portion of a membrane filter supported and fixed on an optically transparent support;

analysing the at least one macroscale image using a computer vision method to determine a countable area of the membrane filter and one or more excluded regions within the countable area of the membrane filter, the excluded regions comprising one or more of membrane filter grid lines, air bubbles and large particulate matter;

inserting the optically transparent support supporting the sample portion membrane filter into a robotic XY stage of a digital phase contrast microscope further comprising an image sensor configured to capture an image of the image plane of the digital phase contrast microscope;

capturing at least one magnified phase contrast image at each of N sample locations located across the countable area of the filter member using the image sensor of the digital phase contrast microscope, where N is at least 20, and the N sample locations are selected such that a field of view at each sample location does not contain an excluded region;

analysing the at least magnified one phase contrast image at each of the N sample locations using a computer vision method to identify and count the number of countable respirable fibres within a counting region of the field of view at each sample location; and counting and reporting the total number of countable respirable fibres counted in the countable area of the membrane filter.

In one form, analysing the at least one macroscale image using a computer vision method further comprises performing a quality assessment of the sample portion of the membrane filter against a set of predefined sample quality criteria comprising identifying one or more tears in the membrane filter, detection of a portion of the membrane filter outside of a coverslip, detection of discolouration of the membrane filter, and the percentage of the membrane covered by air bubbles exceeding a predetermined threshold value, and terminating the method if the sample fails the quality assessment.

In one form, capturing at least one magnified phase contrast image at each of N sample locations comprises:
a) selecting a point within the countable area;
b) determining if the field of view contains an excluded region;
c) if the field of view contains an excluded region, returning to step a);
d) if the field of view does not contain an excluded region, instructing the robotic XY stage to the selected point and capturing at least one magnified phase contrast image, and incrementing a counter;
e) returning to step a) if the counter is less than N, otherwise terminating the capturing step.

In a further form, the step of selecting a point is performed randomly. In another further form, analysing the at least one macroscale image further comprises defining a 2D mapping grid over the countable region, and the step of selecting a point is performed by sequentially selecting a grid point in the 2D mapping grid.

In one form, the method further comprises:
placing a filter portion on the slide using a sample placement stencil located under the optically transparent support that indicates a preferred location for the filter portion;
treating the filter portion to form a membrane filter; and
fixing the membrane filter to the slide using a coverslip.

In one form, analysing the at least one macroscale image comprises identifying a slide boundary and defining a 2D mapping grid over the slide using predetermined known slide dimensions, identifying and storing the grid locations of a coverslip, gridlines on the membrane filter, bubbles on the membrane filter, and any other large particulate matter including dirt.

In one form, capturing at least one macroscale image comprises capturing an image of the slide against a grey background;
and analysing the at least one macroscale image using a computer vision method further comprises:
analysing the image to identify a plurality of reference points on the slide, an edge of the membrane filter and a plurality of gridlines located on the membrane filter within the countable area using the 2D mapping grid; and
analysing the image to identify the locations of air bubbles within the countable area using the 2D mapping grid.

In one form, capturing at least one macroscale image comprises capturing at least one dark image of the slide against the dark background, and at least one light image of the slide against a light background;
and analysing the at least one macroscale image using a computer vision method further comprises:
analysing the at least one light image to identify a plurality of reference points on the slide, an edge of the membrane filter and a plurality of gridlines located on the membrane filter within the countable area using the 2D mapping grid by applying feature detection to the at least one light image to detect features of the slide, coverslip, membrane filter and intersections of grid line, and the detected features are used to anchor geometrical shapes to identify the edges of the coverslip, membrane filter and intersections of grid line using a tetragon shape for the coverslip, a circular arc for the membrane filter, and intersecting straight lines for the grid lines;
analysing the at least one dark image to identify the locations of air bubbles within the countable area using the 2D mapping grid by cropping the dark image around the location of the membrane filter, applying a contrast adjustment, and fitting one or more contours to the contrast adjusted image to identify open and closed air bubbles based on contrast changes.

In one form, the step of capturing at least one magnified phase contrast image at each of N sample locations comprises capturing, at each sample location, a set of Z magnified phase contrast images each captured at a different focal plane, and analysing the at least magnified one phase contrast image at each of the N sample locations comprises Z-stacking the set of Z magnified phase contrast images to obtain a single stacked image, and the computer vision method analyses the single stacked image to identify and count the number of countable respirable fibres within a counting region of the field of view of the single stacked image.

In one form, the computer vision method to identify and count the number of countable respirable fibres within a counting region of the field of view at each sample location comprises:
identifying one or more regions of interest, each region of interest comprising an object;
applying one or more machine learning classifiers trained on a reference set of images of respirable fibres to each region of interest to identify one or more candidate regions of interest which match a reference image;
applying a geometric filter to each candidate region of interest to identify an object having a geometry matching an respirable fibre; and
counting the number of countable respirable fibres.

In a further form, the respirable fibres and countable respirable fibres are asbestos fibres and applying the geometric filter comprises applying a regular asbestos fibre geometric filter to each candidate region of interest using a filtering criteria requiring an object in a candidate region of interest to have a maximum width less than 3 micrometres, a length greater than 5 micrometres and a length:width ratio greater than 3:1, and which does not appear to touch any other object within the candidate region of interest, and each object satisfying the filtering criteria is counted as a single countable fibre.

In a further form, applying the geometric filter further comprises applying a bundled asbestos fibre geometric filter to each candidate region of interest using a filtering criteria requiring an object in a candidate region of interest to have a maximum width less than 3 micrometres, a length greater than 5 micrometres and a length:width ratio greater than 3:1; and which does not appear to touch any other object with a maximum width, defined as the smaller of the two dimensions of the other object, greater than 3 micrometres, and wherein counting the number of countable respirable fibres comprises counting any individually distinguishable fibres, or if no individual fibres can be distinguished then counting the bundle as a single countable fibre.

In a further form, the computer vision method to identify and count the number of countable respirable fibres within a counting region of the field of view further comprises performing a quality assessment of the field of view of the at least magnified one phase contrast image against a set of predefined quality criteria, and terminating further analysis at the sample location if the field of view of the at least magnified one phase contrast image fails the quality assessment.

In a further form, N is the number of sample locations required by an Official Asbestos Sampling Standard or an Official Guidance Note as at 21 Oct. 2016. In a further form, N is between 20 and 100, and the capturing step is terminated when a total of 100 countable respirable fibres have been counted across at least 20 sample locations.

In a further form, each of the at least one magnified phase contrast image has a total magnification of between 40 times and 2000 times, and more preferably between 100 times and 600 times.

In one form the countable respirable fibres are asbestos fibres or synthetic mineral fibres.

In a further form, the optically transparent support is a microscope slide, and the method further comprises loading a plurality of microscope slides each supporting a sample portion membrane filter into a computer controlled autoloader configured to loads and unload one or more microscopes into the robotic XY stage, and inserting the microscope slide supporting the sample portion membrane filter into a robotic XY stage is performed using the autoloader, and wherein each microscope slide comprises a unique identifier, and the method further comprises capturing a representation of the identifier, and performing the capturing analysing and reporting steps for each loaded microscope wherein the reporting also reports the unique identifier of the microscope.

According to a second aspect, there is provided a system for automated analysis of a membrane filter obtained from an air quality monitoring apparatus used for measuring airborne respirable fibre, the apparatus comprising:
a sample imaging apparatus comprising:
    at least one optically transparent support holder for receiving an optically transparent support which in use comprises a sample portion of a membrane filter;
    a sample digital camera with a field of view comprising at least a sample portion of at least one slide when located in the optically transparent support holder;
a robotic microscope platform comprising
a phase contrast microscope;
a motorised XY stage for receiving an optically transparent support;
a motorised Z axis focus drive;
an image sensor located in an image plane
at least one computing apparatus operatively connected to the sample imaging apparatus and the robotic microscope platform, the at least one computing apparatus comprising at least one processor and a memory operatively connected to the processor, and the computing apparatus configured to perform the method of the first aspect.

In one form, the at least one computing apparatus comprises a local computing apparatus and at least one remote computing apparatus, the local computing apparatus either directly connected to the sample imaging apparatus and the robotic microscope platform or connected on a local network and wherein the local computing apparatus is configured to perform the capturing steps and provide the captured at least one macroscale image and the at least one magnified phase contrast image at each of N sample locations to the at least one remote computing apparatus over a network connection, and the remote computing is configured to perform the analysis steps and the counting and reporting step.

In one form, the sample imaging apparatus further comprises:
    a colour changing panel located in a base of the optically transparent support holder for supporting an optically transparent support, wherein the colour changing panel has a dark surface to provide a dark background for a supported optically transparent support and further comprises a switchable light source to provide a light background for the supported optically transparent support.

In one form the sample imaging apparatus further comprises a sample placement stencil located on and supported by the colour changing panel and which supports the optically transparent support holder to indicate a preferred location for the membrane filter.

In one form, the system further comprises a microscope autoloader for storing a plurality of microscope slides and configured to load and unload one or more microscope slides in the motorised XY stage.

According to a third aspect, there is provided a sample imaging apparatus for use in the system of the second aspect.
    at least one optically transparent support holder for receiving an optically transparent support which in use comprises a sample portion of a membrane filter;
    a sample digital camera with a field of view comprising at least a sample portion of at least one slide when located in the optically transparent support holder;
    at least one computing apparatus operatively connected to the sample imaging apparatus and comprising at least one processor and a memory operatively connected to the processor, and the computing apparatus configured to:
    capture at least one macroscale image of at least a sample portion of a membrane filter supported and fixed on an optically transparent support;
    analysing the at least one macroscale image using a computer vision method to determine a countable area of the membrane filter and one or more excluded regions within the countable area of the membrane filter, the excluded regions comprising one or more of membrane filter grid lines, air bubbles and large particulate matter.

In one form, the sample imaging apparatus further comprises:
    a colour changing panel located in a base of the optically transparent support holder for supporting an optically transparent support, wherein the colour changing panel has a dark surface to provide a dark background for a supported optically transparent support and further comprises a switchable light source to provide a light background for the supported optically transparent support.

In one form the sample imaging apparatus further comprises a sample placement stencil located on and supported by the colour changing panel and which supports the optically transparent support holder to indicate a preferred location for the membrane filter.

BRIEF DESCRIPTION OF DRAWINGS

Embodiments of the present disclosure will be discussed with reference to the accompanying drawings wherein:

FIG. 8A is a schematic diagram of a membrane filter illustrating gridlines and excluded regions according to an embodiment;

FIG. 8B is close up of a partial grid illustrating excluded regions and sample locations according to an embodiment;

FIG. 9 is a magnified phase contrast image of a sample location of a membrane filter according to an embodiment;

In the following description, like reference characters designate like or corresponding parts throughout the figures.

DESCRIPTION OF EMBODIMENTS

Figure 1:
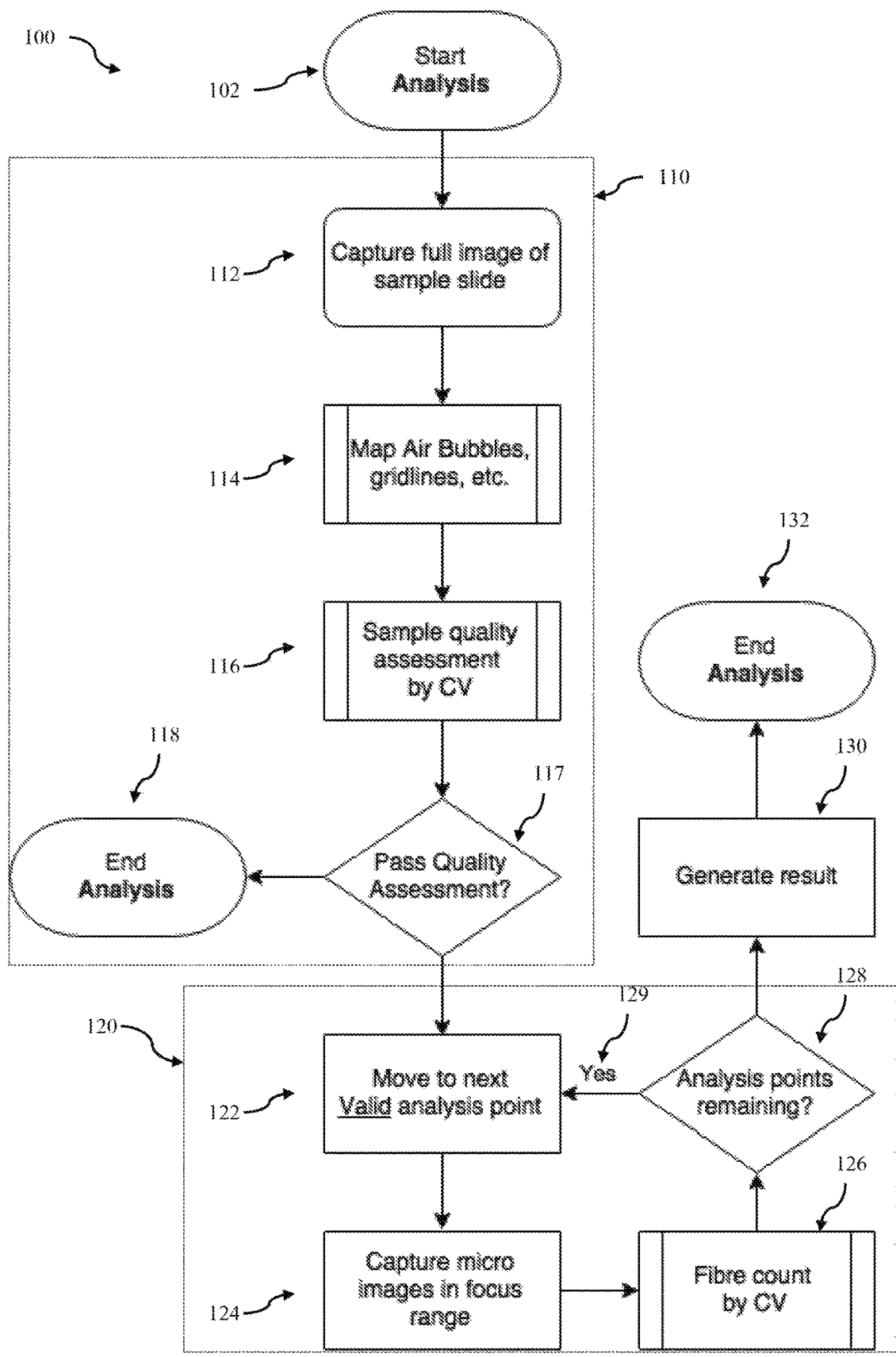
FIG. 1 is a flowchart of a method for automated analysis of a membrane filter obtained from an air quality monitoring apparatus for the presence of asbestos particle according to an embodiment.
Figure 2:
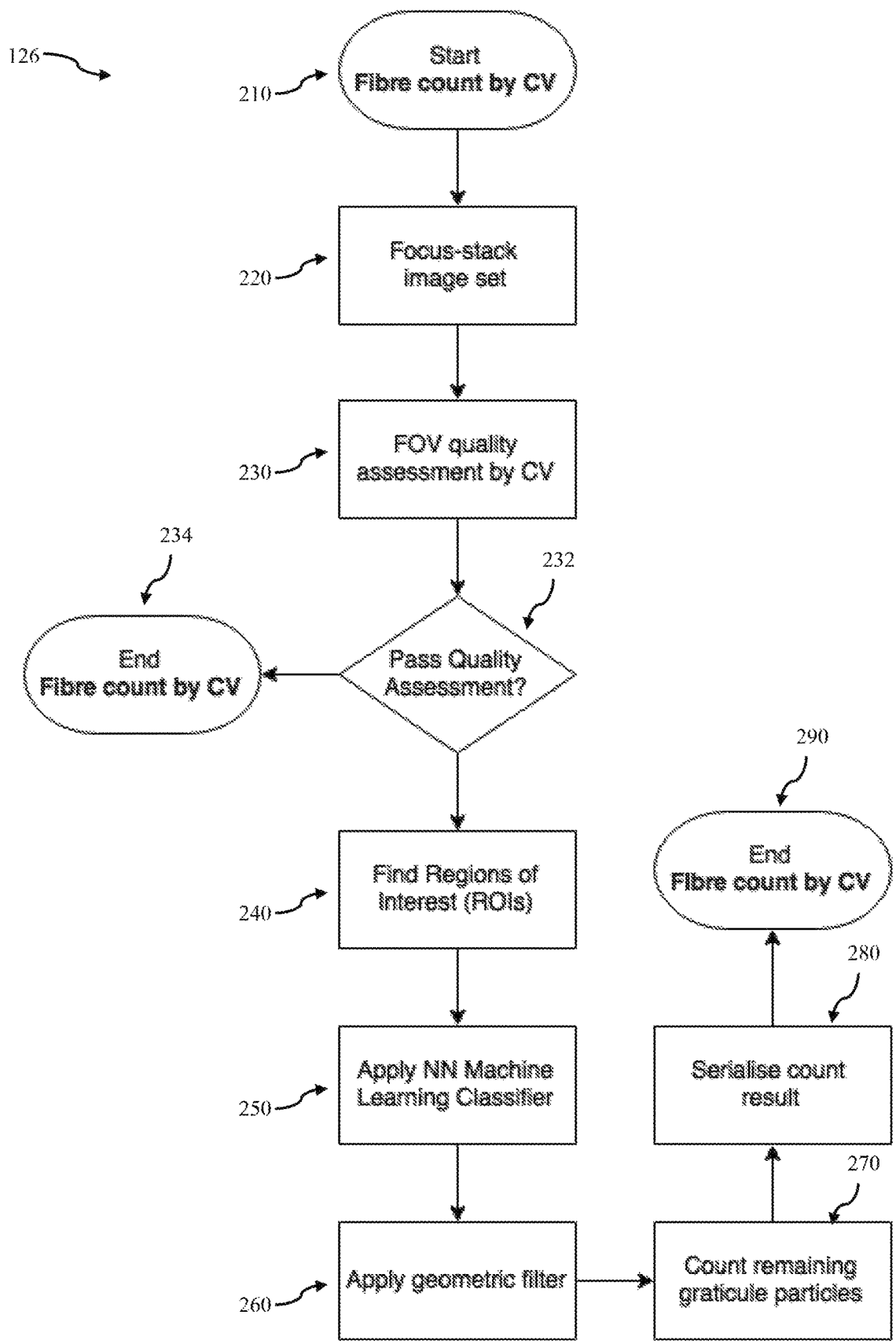
FIG. 2 is a flowchart of an analysing step in the method shown in FIG. 1 according to an embodiment.
Figure 3:
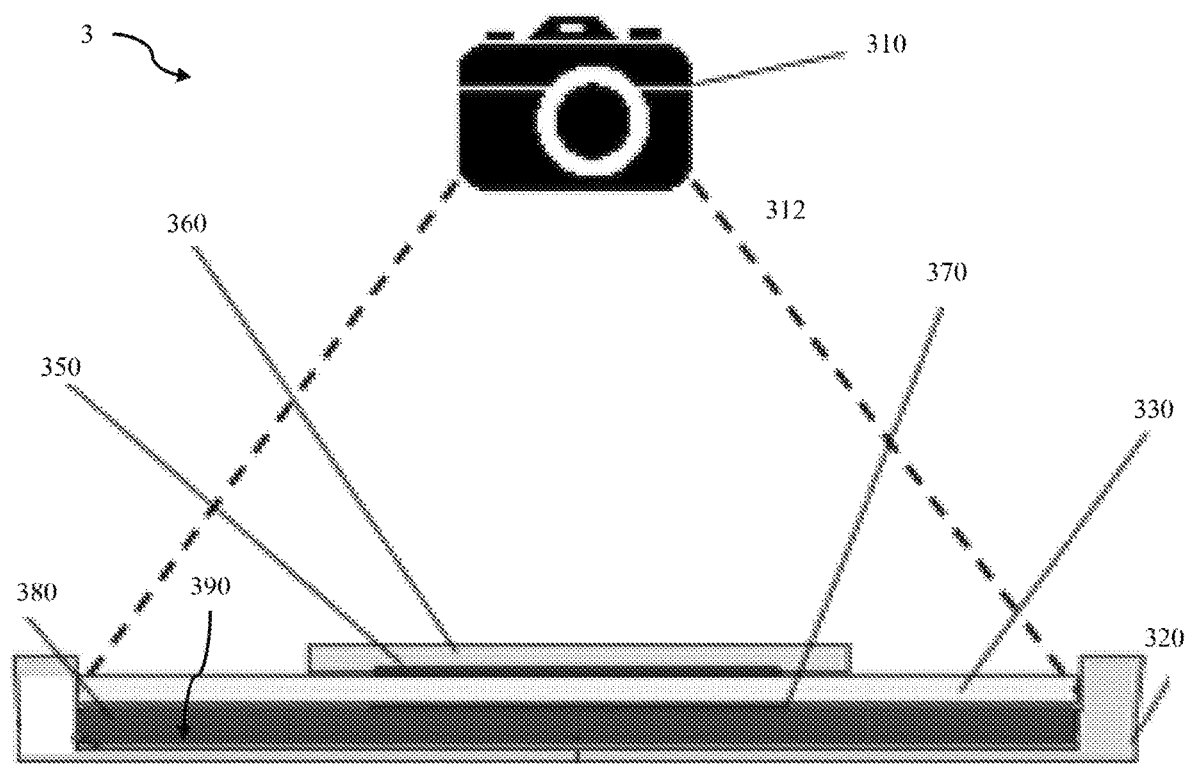
FIG. 3 is a schematic diagram of a sample imaging apparatus according to an embodiment.
Figure 14:
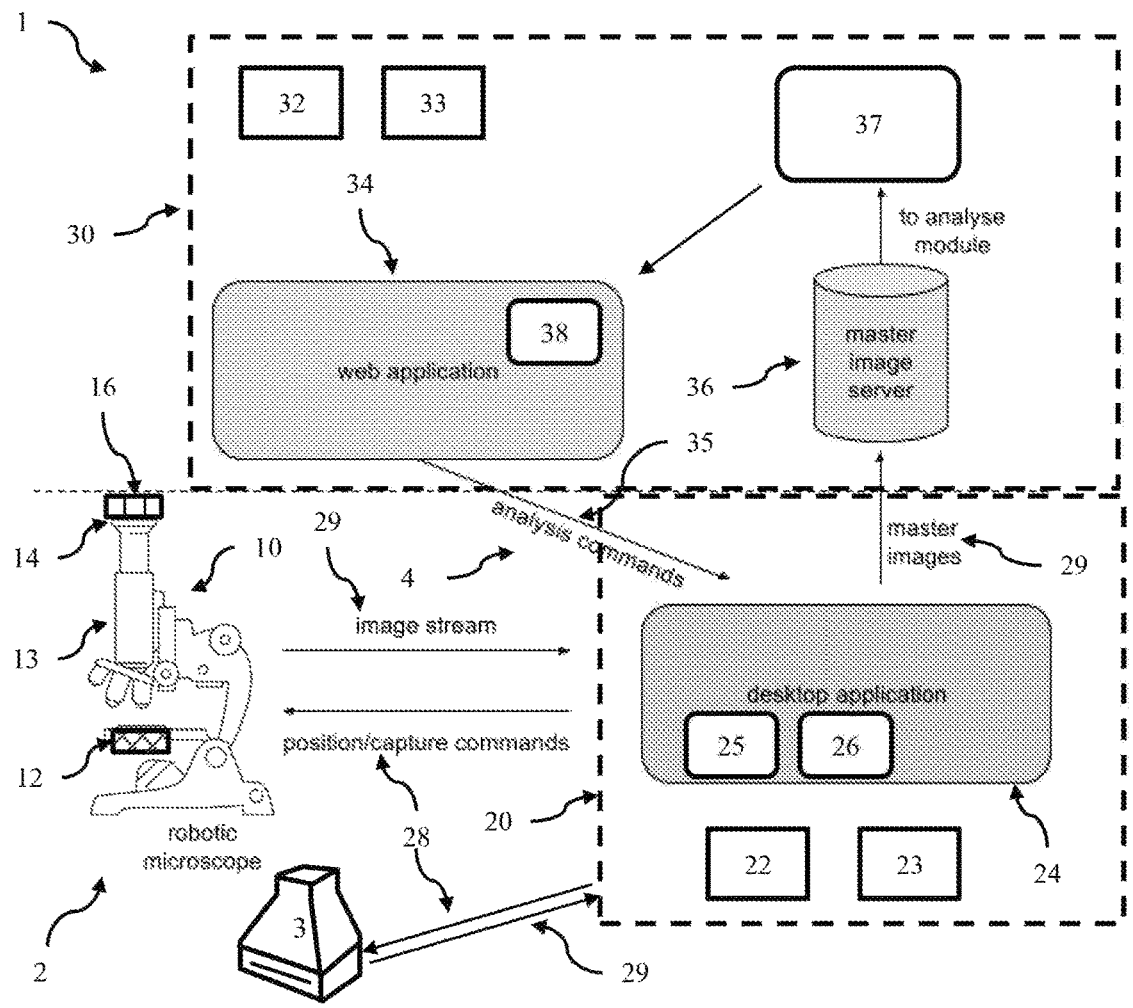
FIG. 14 is a schematic diagram of a system for automated analysis of a membrane filter obtained from an air quality monitoring apparatus according to an embodiment.
Figure 15A:
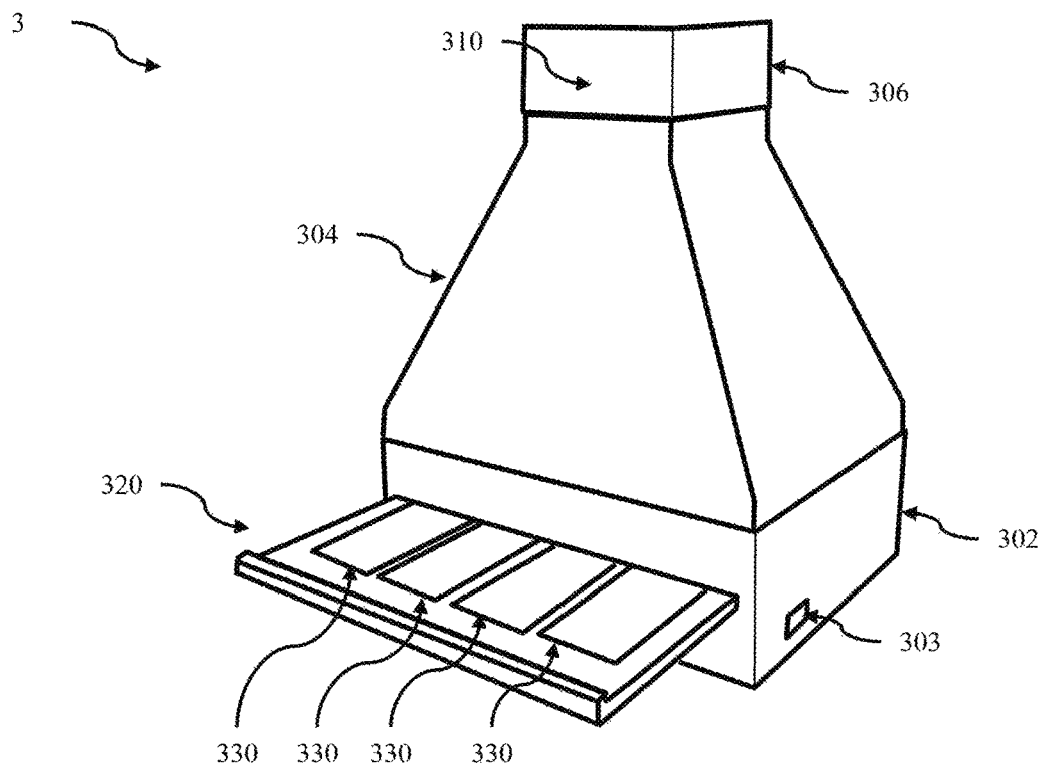
FIG. 15A is a schematic drawing of a sample imaging apparatus for imaging multiple slides according to an embodiment.
Figure 15B:
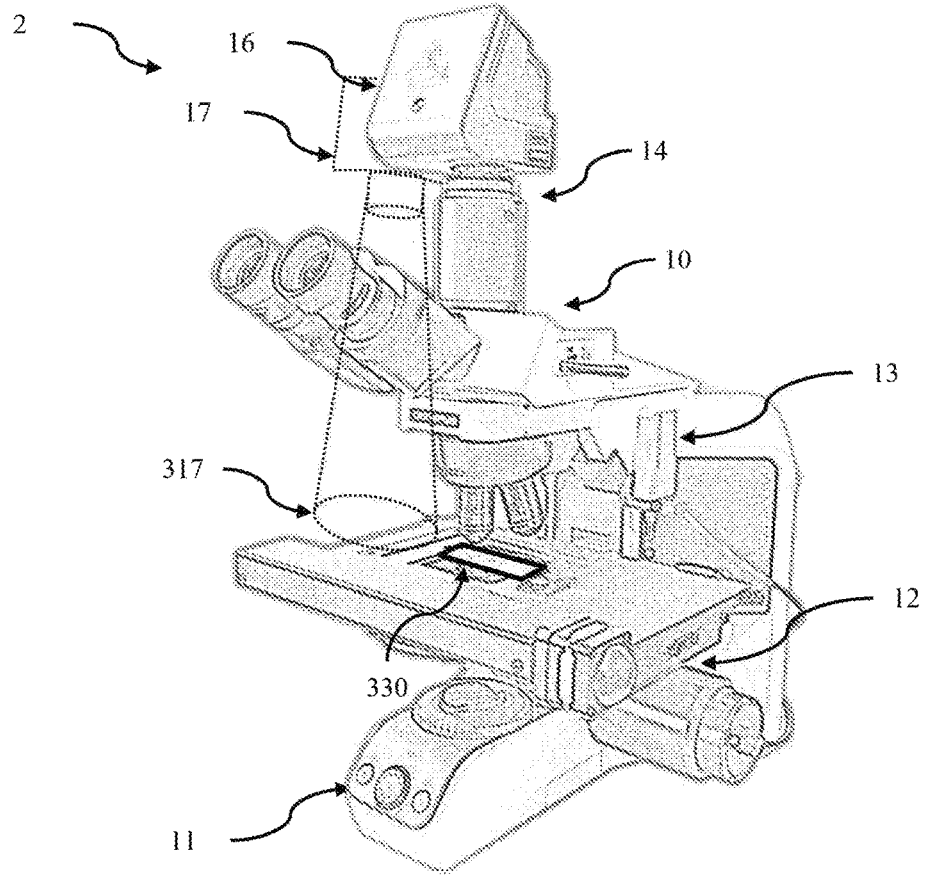
FIG. 15B is a schematic drawing of a robotic microscope platform according to an embodiment.

Referring now to FIG. 1, there is shown a flow chart 100 of a method for automated analysis of a membrane filter obtained from an air quality monitoring apparatus used for measuring airborne respirable fibres such as asbestos and synthetic mineral fibres. FIG. 2 is a flowchart of an analysing step in the method shown in FIG. 1 according to an embodiment. FIG. 3 is a schematic diagram of a sample imaging apparatus according to an embodiment, and FIG. 15A is a schematic drawing of a sample imaging apparatus for imaging multiple slides according to an embodiment. FIG. 14 is a schematic diagram of a system for automated analysis of a membrane filter obtained from an air quality monitoring apparatus according to an embodiment. FIG. 15B is a schematic drawing of a robotic microscope platform according to an embodiment. The membrane filters can be used to capture a range of fibres and one particularly important application is for the detection and counting of asbestos fibres as these remain a serious health issue. As such the following explanation will focus on detection and counting of asbestos fibres. However whilst the system is designed for use measuring asbestos fibres it will be apparent that the system can be adapted to measure other fibres in air samples, such as synthetic-mineral-fibres (SMF), silica fibres, wool fibres and wooden fibres.

The system comprises a robotic microscope platform 2, a sample imaging apparatus 3, for example as illustrated in FIG. 3, and at least one computing apparatus 4 operatively connected to the sample imaging apparatus 3 and the robotic microscope platform 2. For the sake of clarity, the air quality monitor (or air sampler) comprises a removable filter which is treated and converted to form a transparent membrane (typically on a microscope slide, but another optically transparent support surface could be used) and we will refer to this transparent treated filter as a membrane filter. Such filters can be used to capture a range of fibres such as asbestos fibres, synthetic-mineral-fibres (SMF), silica fibres, wool fibres and wooden fibres.

Referring to FIG. 1, the method 100 begins with a start analysis step 102. This initiates a sample imaging stage 110 which comprises an image capturing step 112 in which at least one macroscale image of a membrane filter 350 supported and fixed on an optically transparent support is captured. Typically the optically transparent support is a microscope slide and for ease of understanding the following discussion will typically refer to the use of a microscope slide as the optically transparent support. However it is to be understood that other optically transparent supports such as a sheet of glass, a petri dish, a glass dish, or a plastic slide or dished formed of a suitable material or chemically coated so as not be affected by the sample fixation process. This macroscale image may be an unmagnified image or low magnification (e.g. less than 5 or 10 times). The macroscale image may be full image of the sample slide, or just a sample portion of a membrane filter 350 supported and fixed on an optically transparent support 330 located in an optically transparent support holder 320 (e.g. a microscope slide on a microscope slide holder). An embodiment of a sample imaging apparatus used to capture the image is illustrated in FIG. 3 and described below. As discussed below the membrane filter may be a complete membrane filter, or a portion of a membrane filter. One commonly used filter is circular and larger that a microscope slide and is typically cut in half, and one half converted to a membrane filter and analysed and the other half is stored.

Once a macroscale image is captured it can be analysed using a computer vision method to determine a countable area of the membrane filter and one or more excluded regions within the countable area of the membrane filter. The countable area is a region of the membrane filter within which counting is to be performed. It may be the complete membrane filter sampled fixed on the slide and defined by the edges of the membrane filter. The excluded regions comprise one or more of membrane filter grid lines, air bubbles and large particulate matter. The analysis may be performed as a series of steps. For example a first analysis step 114 may comprises defining a 2D mapping grid over the countable region of the membrane filter and mapping the locations of gridlines, air bubbles and large particulate matter to determine excluded regions for subsequent analysis (based on the guidance notes). The excluded region may be based on detecting a feature and applying a margin of error around the detected feature so the excluded region encompasses the detected feature. A second analysis may comprise performing a quality assessment 116 of the sample portion of the membrane filter against a set of predefined sample quality criteria. If the sample fails the quality assessment 117 then the analysis is terminated 118.

FIG. 3 is a schematic diagram of a sample imaging apparatus 3 according to an embodiment. The sample imaging apparatus 3 provides a means of capturing consistent images of sample slides (or other optically transparent supports) such that sample quality assessment can be conducted. The sample imaging apparatus 3 comprises a microscope slide holder 320 for receiving a microscope slide holder that holds at least one slide and a sample camera 310 with a field of view 312 comprising at least a sample portion of at least one slide 330 when located in the microscope slide holder 320. As discussed above any suitable optically transparent support and optically transparent support holder could also be used. The sample camera is preferably a digital camera, but an analogue camera could be used and the image scanned and digitised. Another embodiment of a sample imaging apparatus 2 for imaging multiple slides is illustrated in FIG. 15A. In this embodiment the apparatus comprises a base 302 and an upper housing 304. A power switch 303 is provided in the base, and the top portion of upper housing 304 comprises a removable cap portion 306 to provide access to a digital camera or imaging sensor 310. The base 304 further comprises a microscope slide holder 320 in the form of a draw that can be slid into and out of the base 302. In this embodiment the microscope slide holder 320 comprises 4 slots or bays for receiving 4 microscope slides 330. The sample imaging apparatus could be a standalone apparatus, or it could be integrated to a robotic microscope platform that receives 1 or more slides from the platform.

Typical air filters used in air sampling or monitoring apparatus are 25 mm diameter circular filters, however some air samplers uses smaller 13 mm diameter circular filters. Other samplers could use other geometries but this does not affect the method as described herein. The filters 350 are mounted on a microscope slide as follows. The filter is placed on a microscope slide and a solvent such as acetone-triacetin added to dissolve or melt the filter to create a transparent membrane on the slide and then fixed to the microscope slide using a coverslip 360. The smaller 13 mm diameter circular filters can be directly placed on a microscope slide 330, however the 25 mm diameter circular filters must first be cut to form a sample portion. Typically the filter will be cut in half to form two half circles, one of which is placed on the microscope slide 330 and converted to a transparent membrane filter 350, and the other which is retained for storage.

As shown in FIG. 3, the sample imaging apparatus comprises a microscope slide holder 320. In this embodiment the apparatus further comprises a colour changing panel located in a base of the microscope slide holder for supporting a microscope slide 330. The colour changing panel has a dark surface 380 to provide a dark background for a supported microscope slide 330 and further comprises a switchable light source 390 to provide a light background for the supported microscope slide. In one embodiment, the dark surface 380 is provided by a translucent black panel with a LED lighting panel located below it. A sample placement stencil 370 may also be located on and supported by the colour changing panel and which supports the microscope slide holder to indicate a preferred location for the filter portion. The filter portion is treated to form a transparent membrane filter, and the membrane filter portion 350 is covered with a coverslip 360 to fix or adhere the membrane filter to the microscope slide 330, which is supported by the stencil 370 (if present) and the colour changing panel. Other arrangements could be used to provide a colour changeable background. For example two coloured panels (one dark, one light) could be swapped in and out (manually or preferably robotically). Other optical/lighting arrangements could also be used, including the use of light projection systems above the slide to control the amount of illumination (or brightness) of the slide. In another embodiment the colour changing background is omitted, and a single grey background is provided and grey scale images collected.

Figure 4A:
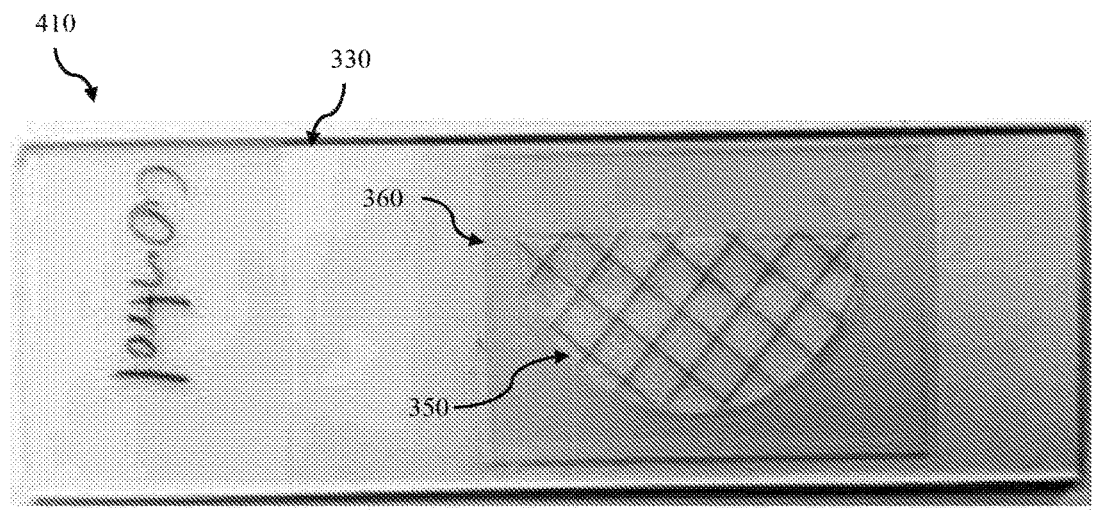
FIG. 4A is a contrast adjusted macroscale image of microscope slide with a sample portion of a membrane filter supported and fixed to the microscope slide taken against a light background according to an embodiment.
Figure 4B:
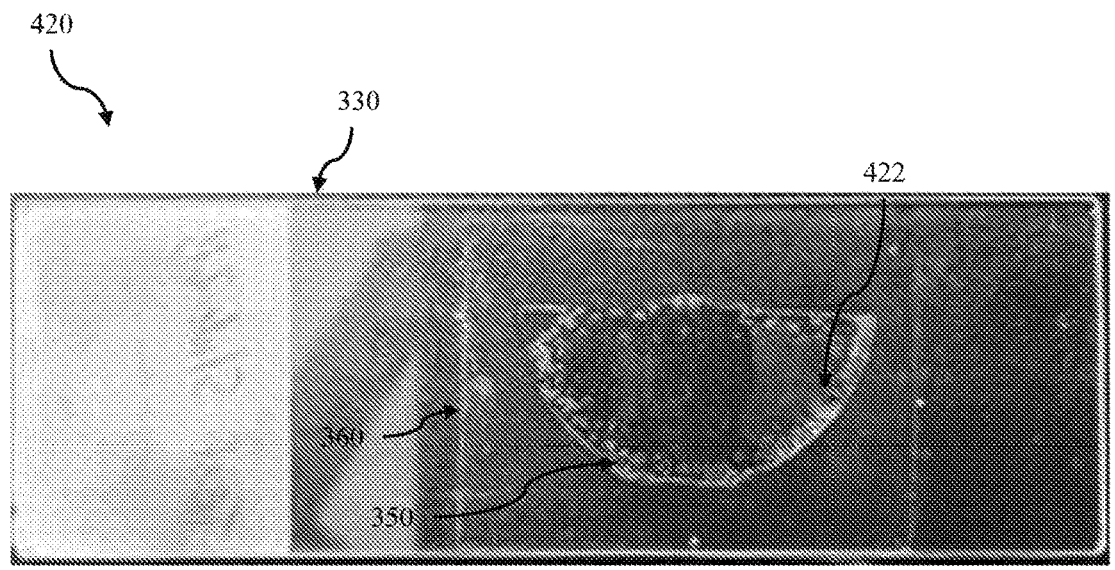
FIG. 4B is a contrast adjusted macroscale image of the microscope slide of FIG. 4A taken against a dark background according to an embodiment.

In one embodiment, to assist in identifying slide features and regions to be excluded at least one dark image of the slide against the dark background is capture and at least one light image of the slide against a light background is captured. FIG. 4A is a contrast adjusted macroscale image 410 of a microscope slide 330 with a sample portion of a membrane filter 350 supported and fixed to the microscope slide taken against a light background according to an embodiment. The coverslip 360 can also be seen along with gridlines on the membrane filter. A slide identifier such as a barcode may also be present on the slide and scanned, or an alphanumeric string is printed or written on the slide and an image taken and then passed through an optical character recognition (OCR) program to detect the slide identifier so that images captured can be associated with the slide identifier. FIG. 4B is a contrast adjusted macroscale dark image 420 of the microscope slide of FIG. 4A taken against a dark background according to an embodiment. In this dark image 420 the slide 330, membrane filter 350, coverslip 360 can be seen along with air bubbles 422 which become trapped during the fixing/adhering of the membrane filter to the slide.

Figure 5A:
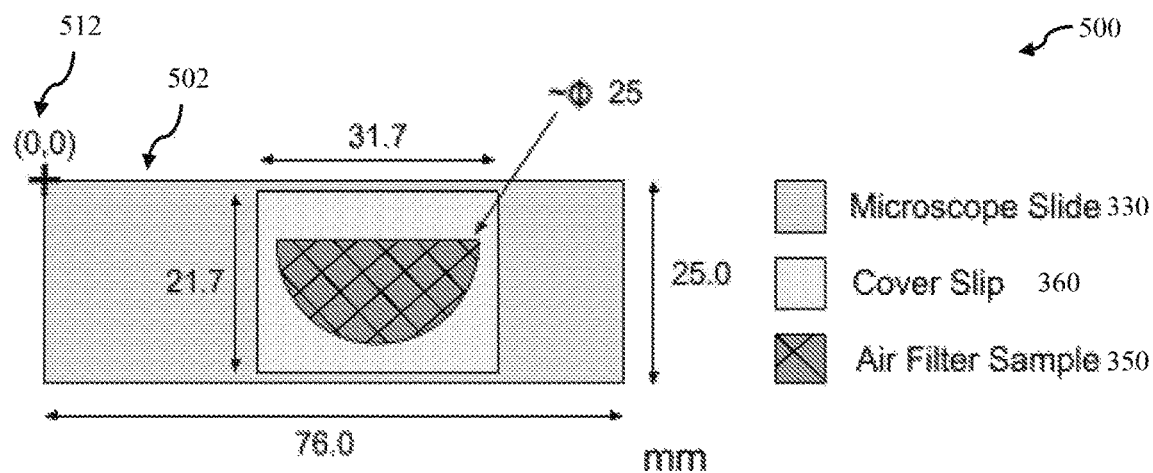
FIG. 5A is a schematic diagram of a microscope slide, coverslip and membrane filter sample showing dimensions according to an embodiment.
Figure 5B:
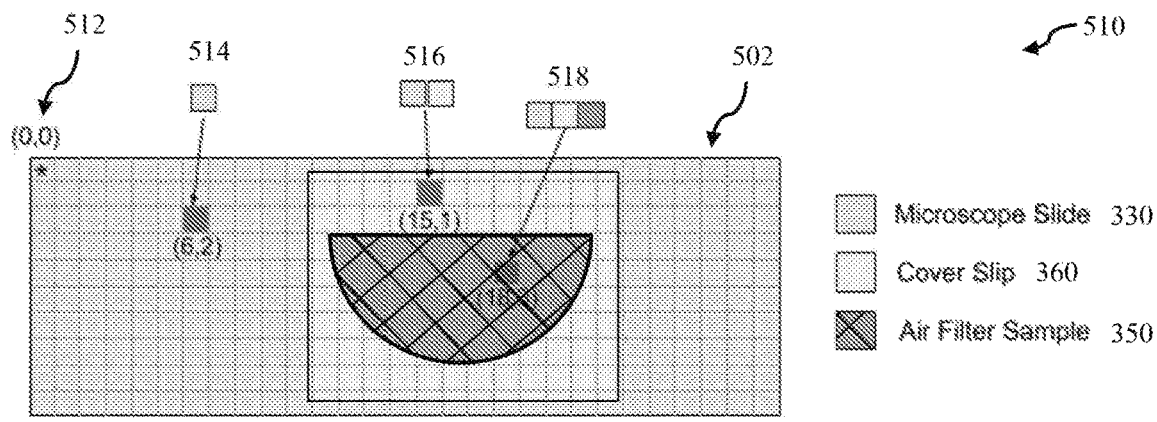
FIG. 5B is a schematic diagram of a 2D grid mapped to the microscope slide of FIG. 5A.

The macroscale images are analysed to define a 2D mapping grid over the countable region using the predetermined known slide dimensions. FIG. 5A is a schematic diagram 500 of a microscope slide 330, coverslip 360 and membrane filter sample 350 showing the known (or measured) dimensions of the slide, cover slip and membrane filter according to an embodiment. The slide boundaries 502 are defined and an origin reference point (0, 0) defined 512 in the top left corner. FIG. 5B is a schematic diagram of a 2D grid mapped to the microscope slide of FIG. 5A. Row and column separation distances are used to define a mapping grid which defines series of grid cells. These can be characterised by the objects within the grid cells. For example grid cell (6, 2) comprises the microscope slide 514, grid cell (15, 1) comprises the microscope slide and cover slip 516, and grid cell (18, 3) comprises the microscope slide, cover slip and membrane filter sample 518. Knowledge of the slide dimensions and cover slip dimensions allow the mapping grid to be used determine real world slide coordinates for instructing the robotic XY stage. The resolution of the grid can be based on the capabilities of the robotic XY stage, and may be matched to the field of view at high resolution (e.g. 600 times) or higher. Capturing the macroscale image and defining a map based on the slide coordinates allows valid sample locations to be identified and excluded regions can be avoided during later capture of high resolution images. Note that the robotic (or motorised) XY stage may also be a robotic (or motorised) XYZ stage. For the sake of clarity XY will be used inclusively to specify at least robotic control of X and Y axes, and does not preclude control of the Z axis as well (i.e. XY= at least XY).

Analysing the one macroscale image using a computer vision method comprises analysing the light image to identify a plurality of reference points on the slide, an edge of the membrane filter and a plurality of gridlines located on the membrane filter within the countable area using the 2D mapping grid and then analysing the dark image to identify the locations of air bubbles within the countable area using the 2D mapping grid.

Figure 6A:
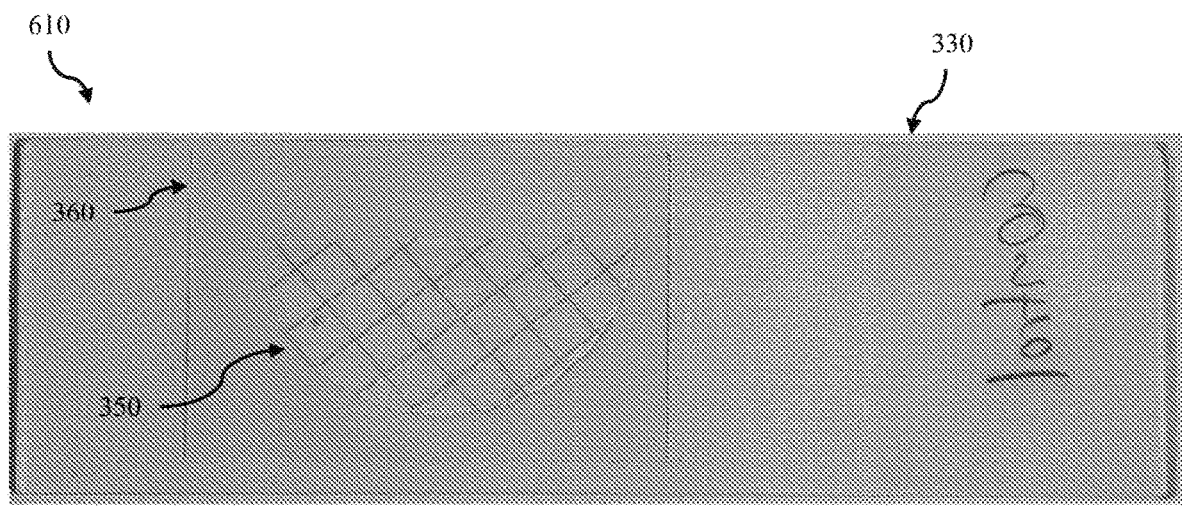
FIG. 6A is a raw macroscale image of microscope slide with a sample portion of a membrane filter supported and fixed to the microscope slide taken against a light background according to an embodiment.
Figure 6B:
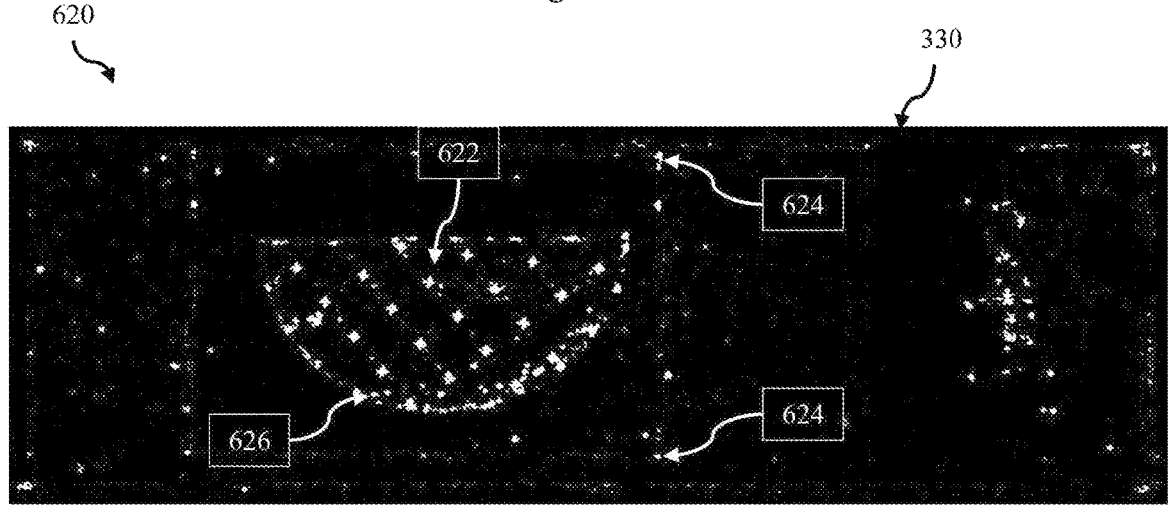
FIG. 6B is the image of FIG. 6A after applying a feature detection algorithm.
Figure 6C:
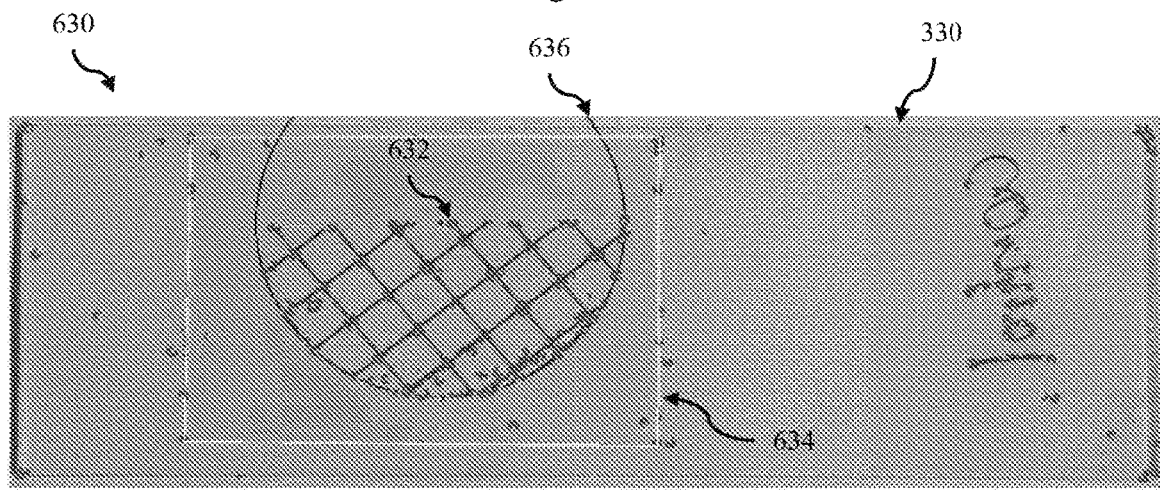
FIG. 6C is the image of FIG. 6A after matching geometric shapes using a feature detection algorithm to identify the slide, coverslip, membrane filter and gridlines according to an embodiment.

As illustrated in FIGS. 6A to 6C analysing the at least one light image comprises applying a feature detection algorithm to the at least one light image to detect features of the slide, coverslip, membrane filter and intersections of grid line. The feature detection algorithm encompasses corner detection, edge detection, line detection etc. which are available in suitable image processing libraries. For example OpenCV, the Open Source Computer vision library available at http://opencv.org includes a set of suitable feature detection algorithms under the feature detection section of the "imageproc" image processing library of OpenCV. FIG. 6A is a raw macroscale image 610 of microscope slide 330 with a sample portion of a membrane filter 350 supported and fixed to the microscope slide taken against a light background. FIG. 6B is the image of FIG. 6A after applying a feature detection algorithm. The feature detection algorithm detects corners of the slide, coverslip 624, membrane filter edge 626 and intersections of grid line 622.

As shown in FIG. 6C, the detected corners and known slide dimensions are used to anchor geometrical shapes to identify the edges of the coverslip 634, membrane filter 636 and intersections of grid line 632 in the image 630. A tetragon shape is used for the coverslip 634, an oval (or circular arc) for the membrane filter 636, and intersecting straight lines for the grid lines 636.

Figure 7A:
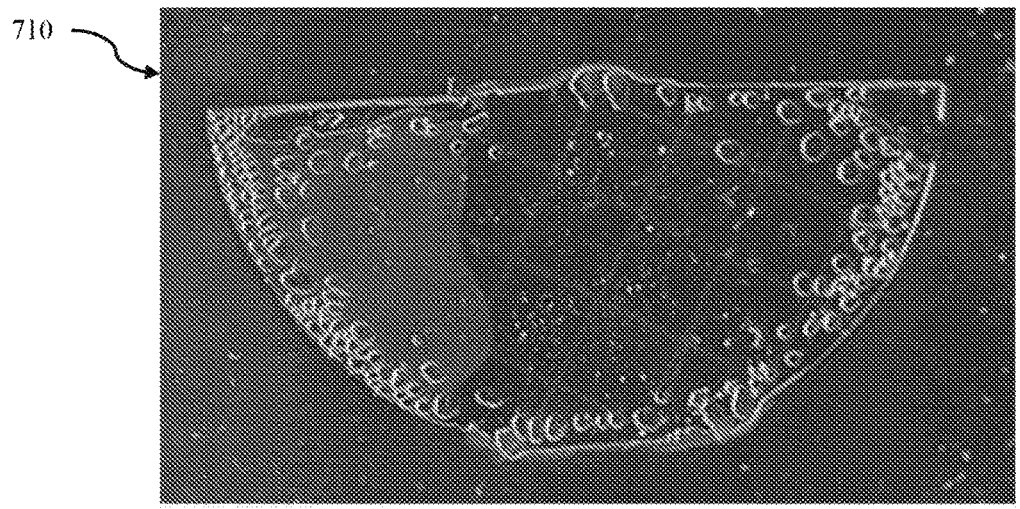
FIG. 7A is a raw macroscale image of microscope slide with a sample portion of a membrane filter supported and fixed to the microscope slide taken against a dark background cropped to the region around the membrane filter identified in FIG. 6C according to an embodiment.
Figure 7B:
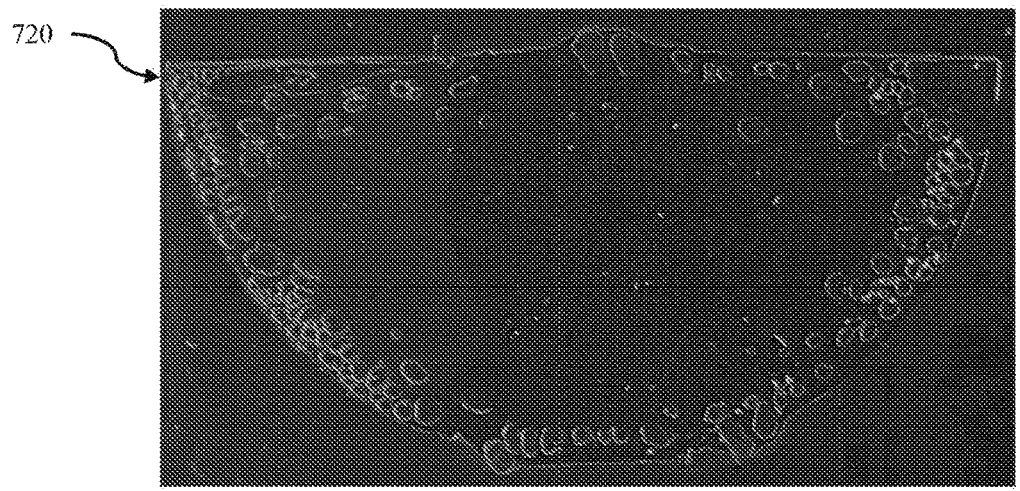
FIG. 7B is the image of FIG. 7A after converting to black and white and applying a contrast adjustment.
Figure 7C:
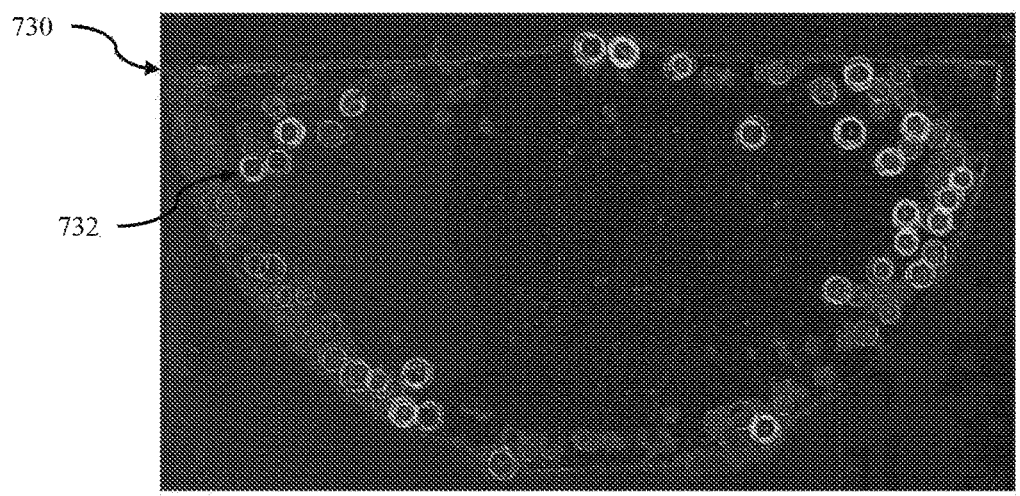
FIG. 7C is the image of FIG. 7B after fitting contours to identify air bubbles according to an embodiment.

After analysis of the light image (or images), the dark image can be analysed to identify air bubbles. FIGS. 7A to 7C illustrate such an analysis according to an embodiment. Analysing the dark image comprises cropping the dark image around the location of the membrane filter. The cropped region may correspond to the coverslip 360 or be a different region. FIG. 7A is a raw macroscale image 710 of microscope slide 330 with a sample portion of a membrane filter 350 supported and fixed to the microscope slide taken against a dark background cropped to the region around the membrane filter identified in FIG. 6C according to an embodiment. A contrast adjustment is then applied to the cropped image to improve the accuracy of bubble detection. To further assist the accuracy the image may be first converted to a black and white image (or grey scale image). FIG. 7B is the image 720 of FIG. 7A after converting to black and white and applying a contrast adjustment. A large air bubble can be seen in the left hand side which is identifiable based on a contrast difference. Contours are then fitted to the contrast adjusted image to identify open and closed air bubbles based on contrast changes. In one embodiment a threshold contrast level is used to define a bubble boundary, or a set of predefined contour levels based on reference images may be used, for example by looking for strong gradients or rapid spatial changes in contrast (i.e. close proximity of contours). In one embodiment the excluded region is obtained by detecting the edge of the air bubble, and then expanding or extending the edge so the excluded region has a larger area than the detected air bubble. FIG. 7C is the image 730 of FIG. 7B after fitting contours (circular segments) to identify air bubbles 732 according to an embodiment.

In other embodiments, the dark image could be analysed before the light image (in this case no cropping is performed and contours are fitted to the entire image). In other embodiments, a single grey background is used and a single macroscale image is captured and analysed (rather than separated black and white images). The captured image can be a colour image or a greyscale image. In this embodiment the background has RGB or grey scale values between 60 and 195 on a 255 scale. A suitable image can be analysed using the computer vision techniques discussed above by first applying a feature detection algorithm to detect features of the slide, coverslip, membrane filter and intersections of grid line, followed by detection of air bubbles or large particulate matter such as dirt.

Other image filtering techniques and methods may be used to identify air bubbles or large particulate matter such as dirt. For example computer vision techniques such as morphological opening or closing techniques can be used to identify air bubbles and map their edges. Machine learning techniques could also be used, for example a classifier trained on a reference set of images comprising air bubbles could be used. Once features such as grid lines, membrane edge, air bubbles, dirt particles, etc., are detected these are used to define excluded regions. In one embodiment the detected edge of a feature is used to define the edge of an excluded region comprising a detected feature. In another embodiment an additional buffer region is added to the detected edge of the feature, so the excluded region has an area larger than (and includes) the detected feature (i.e. the excluded region comprises the feature and a buffer region). The size of the added buffer region may depend upon the type of feature. For example in the case of the outer boundary of the membrane the excluded region may extend inwards 2-5 mm from the detected edge. In the case of grid lines or air bubbles a percentage such as 5% may be used. Further the excluded region may be defined on a pixel by pixel basis or grid cell by grid cell basis. That is once the mapping grid is defined, each cell in the grid may be assigned a binary excluded status (included or excluded). Any grid cells which contain a detected feature can be assigned an excluded status, and then a buffer region is defined as the next n adjacent grid cells, in both X and Y directions, which are also assigned an excluded status.

Once the macroscale image has been analysed to determine a 2D grid and identify excluded regions, a quality assessment of the sample portion of the membrane filter against a set of predefined sample quality criteria can be performed (step 117), and the method can be terminated (118) if the sample fails the quality assessment. For example the quality criteria may include criteria that indicates the filter has been damaged, improperly prepared, or is significantly contaminated, and if one or more of these conditions (or quality criteria) is detected the sample fails the quality assessment. For example suitable quality criteria include the presence of one or more tears in the membrane filter, detection of a portion of the membrane outside of the coverslip (indicating improper preparation), discoloration of the membrane indicating over-saturation of acetone or a high proportion of air bubbles and/or particulate on the sample. For example a threshold percentage of 25% or 50% bubble and/or particulate coverage percentage (of usable membrane filter area) could be used. These criteria can be assessed using image analysis for example to detect tear like structures, or a histogram of pixel colours, or by classifying and then counting contaminated cells using the 2D grid.

FIG. 8A is a schematic diagram 800 of a membrane filter illustrating the filter edge 802, gridlines 804 and excluded regions according to an embodiment. In this embodiment the excluded regions comprise regions around gridlines 812, air bubbles 814 and large particulate matter 816 such as dirt. The locations (e.g. grid coordinates) of the excluded regions are saved.

Returning to FIG. 1, if the sample has passed the quality assessment, and the excluded regions have been mapped and stored, the next stage is the high resolution scanning and fibre counting stage 120. This broadly comprises inserting the microscope slide supporting the sample portion membrane filter into a robotic XY stage of a digital phase contrast microscope. As indicated above the robotic XY Stage may be a robotic XY stage only or a robotic XYZ stage. Also the robotic XY stage may be configured to support multiple slides. In this case each slide held by the XY stage is analysed in sequence. The digital phase contrast microscope comprising an image sensor or camera is configured to capture an image of the image plane of the digital phase contrast microscope. FIG. 9 is a magnified phase contrast image 900 of a sample location of a membrane filter according to an embodiment. As can be seen in FIG. 9, the image comprises various objects 902, 904, 906 and 908 which may be asbestos fibres (or countable respirable fibres).

Figure 10:
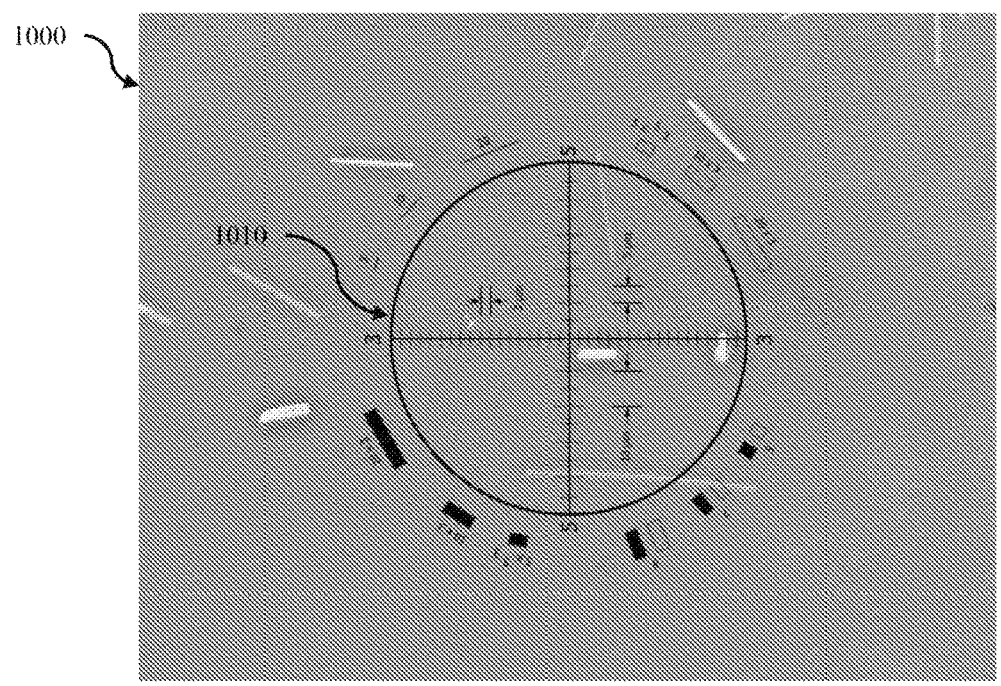
FIG. 10 is a phase contrast image of a sample location of a membrane filter at a total magnification of 400 times showing a counting graticule according to an embodiment.

The scanning and fibre counting stage 120 comprises capturing at least one magnified phase contrast image at each of N sample locations located across the countable area of the filter member using the image sensor of the digital phase contrast microscope. The N sample locations are selected such that a field of view at each sample location does not contain an excluded region. N will typically be at least 20, and may be the number of sample locations required by an Official Asbestos (or other fibre) Sampling Standard or an Official Guidance Note or a range defined by such a Standard or Note according to a version current or published as of 21 Oct. 2016 such as "Guidance Note on the Membrane Filter Method for Estimating Airborne Asbestos Fibres [NOHSC: 3003 (2005)]", or 29 CFR 1910.1001b Occupational safety and health standards: detailed procedure for asbestos sampling and analysis—Non-Mandatory. Washington, D.C.: U.S. Department of Labor, Occupational Safety and Health Administration (OHSA 1994). In one embodiment N is between 20 and 100, and the capturing step is terminated when a total of 100 countable respirable fibres have been counted across at least 20 sample locations. In other embodiments N can be much higher such as 1000 or more. In one embodiment every location across the countable area of the sample that does not contain an excluded region is selected, i.e. the whole sample is scanned, or at least all of the countable portion of the countable area is scanned. The scanning and fibre counting stage 120 further comprises analysing the at least magnified one phase contrast image at each of the N sample locations using a computer vision method to identify and count the number of countable respirable fibres within a counting region of the field of view at each sample location. In one embodiment the counting region is defined by a counting graticule, such as a Walton-Beckett graticule provided in the optical path of the microscope (and thus captured in the image). FIG. 10 shows an image with a Walton-Beckett graticule. Alternatively the counting region of the field of view may be area such as a circle or square with predefined dimensions or area based on the total magnification of the image. In another embodiment the counting region may be the entire field of view. Once sufficient sample locations have been obtained, a result generation step 130 is performed which reports the total number of fibres counted in the countable area of the membrane filter, along with any other relevant information (date, time, location, quality assessments, sample ID, slide ID, etc.) and the analysis is terminated 132. As discussed countable respirable fibres are those which have a geometry matching asbestos fibres (or the target respirable fibre). Whilst most asbestos fibres have a geometry matching a countable a fibre, the countable respirable fibres are not guaranteed to be asbestos fibres. As such, the number of countable respirable fibres acts as an accepted measure or proxy for the number of asbestos (or target respirable) fibres in the sample.

In one embodiment the scanning and fibre counting stage 120 is performed cyclically. The step comprises moving to the next valid analysis point 122 for example a field of view which does not include an excluded region. That is a valid analysis point is one that is sufficiently distanced from the perimeter of the sample edge, not within an air bubble, and not on a gridline or contaminated by a dirt particle or similar. Once at a valid location, one or more magnified phase contrast image in the focus range are captured 124 and then fibre counting is performed on the captured images using computer vision techniques 126. If there are any analysis points remaining 128, the XY stage is moved to the next valid analysis point 122 and the cycle repeats.

In one embodiment this may be performed by first a) selecting a point within the countable area and b) determining if the field of view contains an excluded region (based on the analysis of the macroscale image). If the field of view contains an excluded region then we return to step a). If the field of view does not contain an excluded region an instruction is provided to the robotic XY stage to move the slide to the selected point (122) and capturing at least one magnified phase contrast image (124). A counter is incremented. The cycle repeats by returning to step a) if the counter is less than N, otherwise the capturing step is terminated. In a further form, the step of selecting a point is performed randomly. For example a random X value and random Y value is selected (x, y), and once selected a check is made to determine if the field of view centred at this (x, y) point falls within an excluded region or not. If the field of view at this point does contain an excluded region, then either new random point is selected, or an attempt is made to find a nearby point to use, for example by perturbing the random location by a small offset, for example equal to one field of view, and this perturbed point tested to see if it contains an excluded region or not. In another further form, analysing the at least one microscale image further comprises defining a 2D mapping grid over the countable region. The grid has a constant row and column separation (not necessarily the same) and selecting a point is performed by sequentially selecting the next grid point in the 2D mapping grid and determining if that grid point is a valid point or not (i.e. does the field of view contain an excluded region or not).

This is illustrated in FIG. 8B which is a close up of a partial grid region 810 of FIG. 8A illustrating excluded regions and sample locations according to an embodiment. This embodiment illustrates a first row of candidate sample regions 820 starting at region i to region i+7, and a second row of candidate sample regions 822 starting at region j to region j+7. In this embodiment the candidate sample points have constant spacing along the row and the rows 820 and 822 are offset, but in other embodiments they may be aligned, or non constant spacing may be used. Each candidate sample point represents a field of view of the microscope at a predefined magnification. In region 810 there is an air bubble 814 and a large dirt particle 816, along with grid edges 812. Thus valid sample points are points i, i+3, i+4, j+1, j+2, j+3, j+4, and j+5. Candidate sample points i+1, and i+2 are invalid (rejected) due to the presence of excluded region of air bubble 814 in their field of view, candidate sample points i+5, and j+6 and j+7 are invalid due to the presence of excluded region of dirt particle 816 in their field of view, and candidate sample points i+7, and j are invalid due to the proximity to grid lines—that is they include the excluded region 812 surrounding grid lines in their field of view.

At each sample location, one or more images are captured. Whether one or more images are captured will depend upon the magnification of the microscope and whether the depth of field at the magnification is sufficient to capture all of the particles on the filter between the microscope slide and cover slip (that is physical thickness of the membrane filter exceeds the depth of field at that magnification). Typical magnifications are between 100 and 600 times (for example 200, 400, or 450 times) although lower magnifications such as 40 or 50 times (the limit of human resolution), or higher magnifications such as 2000 times (the limit of optical microscopy) could be used. At total magnifications up to 200 the depth of field is generally sufficient to capture all countable respirable fibres or particles on the membrane filter. FIG. 10 is a phase contrast image 1000 of a sample location of a membrane filter at 400 times total magnification. A counting graticule 1010 is also shown. In this embodiment the counting graticule is a Walton Beckett Graticule. In cases where the depth of field is less than vertical distance between the microscope slide and coverslip, a technique known as focus stacking may be used to identify all possible particles. This effectively combines the Z images over the vertical depth (z) into a single image for analysis. In other embodiments alternative approaches such as feature tracking of fibres across Z multiple images across the vertical (z) depth of the sample may be used (i.e. the Z images separately analysed).

Figure 11:
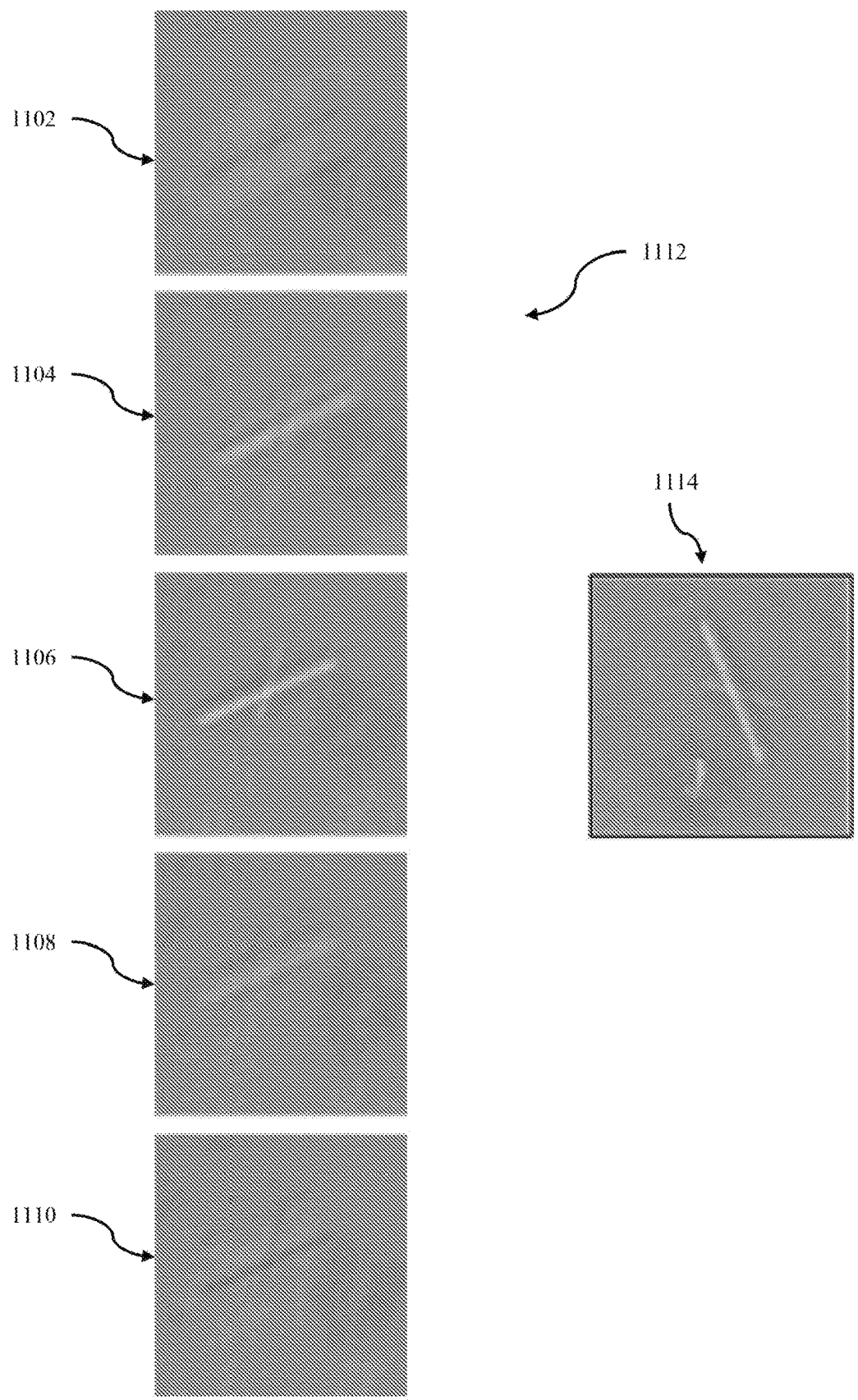
FIG. 11 is a schematic diagram of set of Z magnified phase contrast images taken at different focal planes spanning the vertical (z) depth of the sample and a Z-stacked composition image according to an embodiment.

In focus stacking, a set of Z magnified phase contrast images are each captured at a different focal planes spanning the vertical (z) depth of the sample. This is achieved by holding the XY location of the slide constant, but varying the Z axis of the focus drive of the microscope (so that images at different focal planes are captured over the vertical (z) depth of the sample). This can be performed using a motorised or robotic Z axis focus drive. The set of Z magnified phase contrast images are Z-stacked to obtain a single stacked image for analysis. FIG. 11 is a schematic diagram of set 1112 of Z magnified phase contrast images 1102 1104 1106 1008 1110 taken at different focal planes across the vertical depth of the sample and a Z-stacked composite image 1114 according to an embodiment. The Z stacking is implemented in computer vision libraries and operate by using feature detection (e.g. edge detection, corner detection, etc.) and/or Fourier analysis to detecting in-focus regions of each image and the in-focus patches are then blended together to generate the final composition image. The final composite or single stacked image is then analysed to identify and count the number of countable respirable fibres within a counting region of the field of view of the single stacked image. In an alternative embodiment the multiple images are not combined into a single image, and instead a particle detection approach is used which tracks particles that exist in multiple focus planes. In this embodiment the position of a particle is recorded in each image and searches made across the other images to determine whether particles in the other images are duplicates of this particle, or new particles which were not previously visible. This can be performed by defining a search region which may be the particle location plus some error margin, and for each other image, determining if another particle falls within the search region. This may require the entire new particle to fall within the search region, or the area of the new particle must have a predefined threshold percentage (e.g. 50%, 75%, 90%, 95%) within the search region (e.g. based on pixel counts and/or comparisons). Additional criteria can be imposed such as requiring the duplicate particles to be linked across (vertically) adjacent images.

Once a single image (either raw or composite Z stacked image) or a set of Z images over the vertical depth, at a sample location is obtained it is analysed using a computer vision method to identify and count the number of countable respirable fibres within a counting region of the field of view.

FIG. 2 is a flowchart of the analysing step 126 in the method shown in FIG. 1 according to an embodiment. At step 210 fibre counting by computer vision is started. At step 220 focus stacking of the image set is performed if required, and a field of view quality assessment may be performed using computer vision techniques. This comprises comparing the focus stacked image against set of predefined quality criteria, and terminating further analysis 234 at the sample location if the field of view of the magnified phase contrast image fails the quality assessment 232. Quality assessment criteria include dust loading, which is calculated by simply filtering all particles from the background for all field of views and calculating an average intensity. If the average is too high (e.g. more than 15% dust) the filter is too cluttered and results considered invalid (i.e. reject this sample location). Other quality measures may include analysing the particle loading/distribution to detect uneven particle loading/distribution that indicate an under-performing sampling device, or unusual image properties that may indicate poor quality (e.g. brightness range, colour range, etc.). For example, and as discussed above, discoloration of the membrane can indicate over-saturation of acetone during sample preparation, and thus an analysis of the pixel colour distribution could be performed to detect discoloration such as by determining the number of pixels (or a percentage) within a certain predetermined discolouration colour range. In an embodiment where a graticule is used, a criteria such as more than one-eighth (12.5%) of a graticule area covered by an agglomerations of fibres and/or particles could be used. Other area based thresholds could be used such as at least 10%, 15% or 20% coverage of the counting region. Machine learning approaches could be used based on a reference set of good and/or poor quality slides.

If the magnified phase contrast image passes the quality assessment (or it is not performed) then the next step 240 is to identify regions of interest in the field of view. The next step 250 is to apply a computer vision method, such as one or more machine learning classifiers trained on a reference set of images of asbestos fibres to identify regions of interest which match known asbestos fibre images. At step 260 a geometric filter is applied, and the number of countable respirable fibres in the field of view is counted 270. At step 280 the count result is totalled (serialised) and reported and the analysis is terminated 290. Such an analysis can be varied for other fibres by replacing the asbestos training images, with a suitable set of training images for the desired fibre. Strictly the system does not positively identify the target fibre type (e.g. asbestos fibres). Rather it detects objects which appear similar to known images of the target (or desired) fibre, and these objects are counted and used as a proxy measure of the number of target fibres in the sample.

Figure 12:
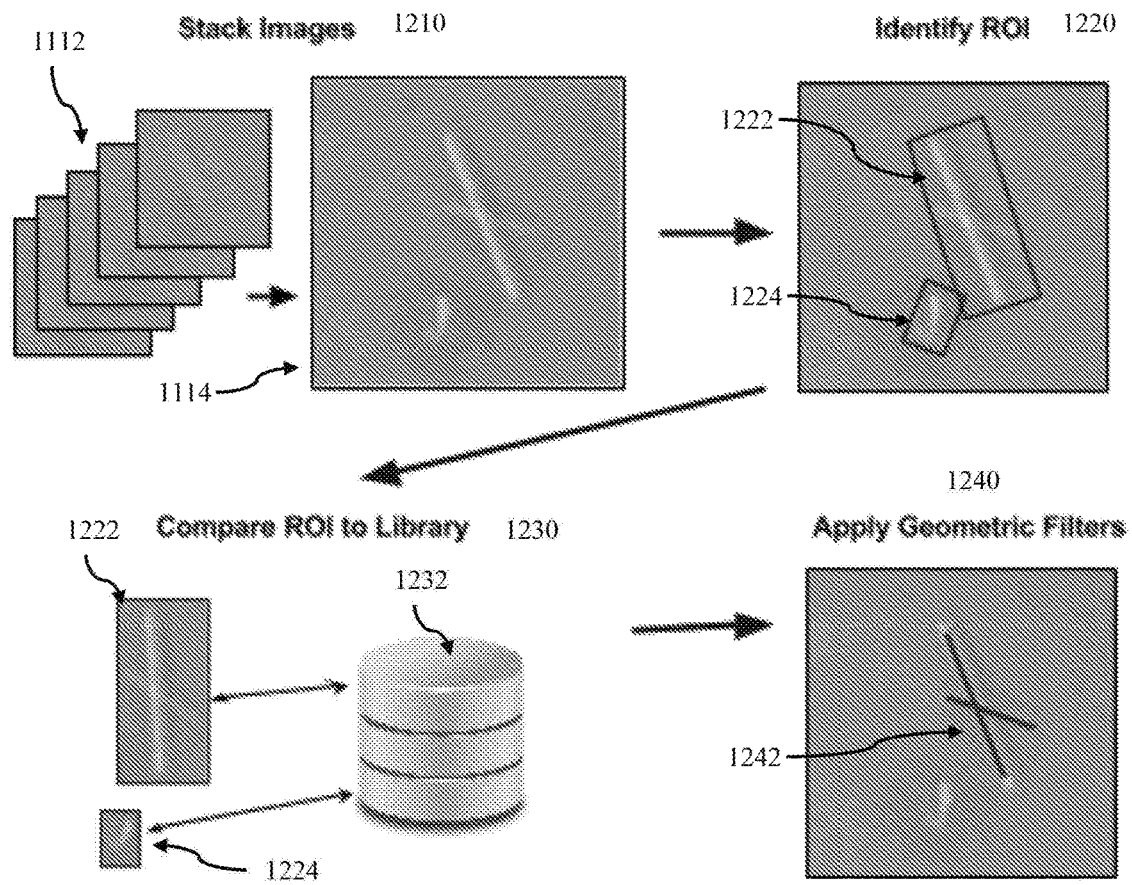
FIG. 12 is a schematic illustration of the flowchart shown in FIG. 2 according to an embodiment.

FIG. 12 is a schematic illustration of the flowchart shown in FIG. 2 according to an embodiment. This method comprises optionally stacking images 1210. Then for each stacked image, identifying one or more regions of interest 1220. Each region of interest comprises an object that may be an asbestos particle (or countable fibre). FIG. 12 shows two regions of interest 1222 and 1224 identified in composition image 1210.

The next step is to compare each region of interest with a library of reference images 1230. This may be performed using one or more machine learning classifiers trained on a reference set of images of target respirable fibres (e.g. asbestos fibres) 1232 to each region of interest 1222 1224 to identify one or more candidate regions of interest which match a reference image. In this embodiment both regions of interest match reference images and are considered candidate regions of interest. Next a geometric filter 1240 is applied to each candidate region of interest to identify if an object has a geometry matching the target respirable fibre (e.g. an asbestos fibre). As shown in FIG. 12, the first region of interest 1222 comprises an objection with a geometry that passes the geometrical filter, but the second region of interest 1224 failed the geometrical filter and was excluded. The number of countable respirable fibres in the regions of interest passing the geometrical filter is the counted and reported.

In one embodiment, the geometric filter comprises is a regular asbestos fibre geometric filter. This uses a filtering criteria requiring an object in a candidate region of interest to have a maximum width less than 3 micrometres, a length greater than 5 micrometres and a length:width ratio greater than 3:1, and which does not appear to touch any other object within the candidate region of interest. Each object satisfying the filtering criteria is counted as a single countable fibre. These parameters may be varied for other respirable fibre types. Most other respirable fibres of interest have similar length to width ratios (i.e. 2:1, 3:1, 4:1) although most other fibres of interest tend to have larger diameter than asbestos fibres.

Figure 13:
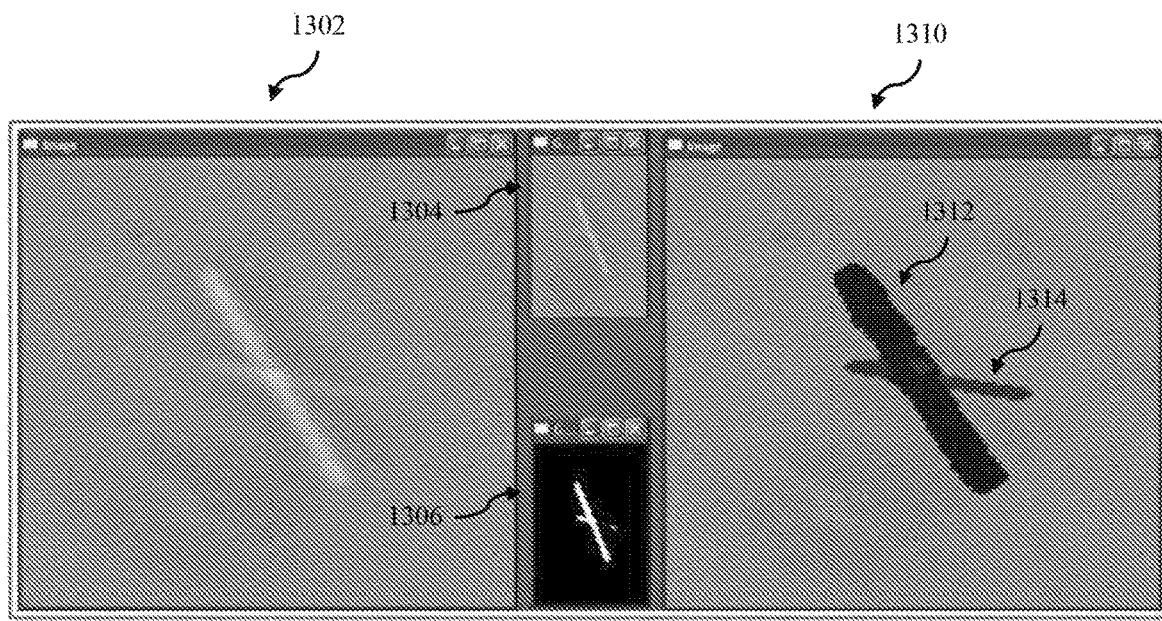
FIG. 13 is schematic diagram of the computer vision processing of a bundled fibre according to an embodiment.

In some cases regions of interest comprise bundled fibres. FIG. 13 is schematic diagram of the computer vision processing of a bundled fibre according to an embodiment. Thus in one embodiment a bundled asbestos fibre geometric filter is applied. This uses a filtering criteria requiring an object in a candidate region of interest to have a maximum width less than 3 micrometres, a length greater than 5 micrometres and a length:width ratio greater than 3:1; and which does not appear to touch any other object with a maximum width, defined as the smaller of the two dimensions of the other object, greater than 3 micrometres. Counting of a bundled fibre is more difficult. In this case counting the number of countable respirable fibres comprises counting any individually distinguishable fibres, or if no individual fibres can be distinguished then counting the bundle as a single fibre. Individually distinguishable fibres can be identified using the single fibre criteria with the limitation that it may touch another object. Alternatively another more complex shape based computer vision technique can be used to identify whether the bundle is distinct fibres or not. Alternatively the bundled fibres may be visually inspected by an operator and manually counted.

In a further form, the computer vision method to identify and count the number of countable respirable fibres within a counting region of the field of view further comprises performing a quality assessment of the field of view of the at least magnified one phase contrast image against a set of predefined quality criteria, and terminating further analysis at the sample location if the field of view of the at least magnified one phase contrast image fails the quality assessment.

FIG. 14 is a schematic diagram of a system for automated analysis of a membrane filter obtained from an air quality monitoring apparatus according to an embodiment. The system comprises a robotic microscope platform 2, a sample imaging apparatus 3, for example as described above and illustrated in FIG. 3, and at least one computing apparatus 4 operatively connected to the sample imaging apparatus 3 and the robotic microscope platform 2. The sample imaging apparatus 3 comprises a microscope slide holder 320 for receiving a microscope slide holder and a sample digital camera 310 with a field of view 312 comprising at least a sample portion of at least one slide 330 when located in the microscope slide holder 320. The robotic microscope platform 2 is further illustrated in FIG. 15B and comprises a phase contrast microscope 10, a motorised XY stage 12 for receiving a microscope slide, a motorised Z axis focus drive 13, and an image sensor 16 located in an image plane 14. The phase contrast microscope can be a monocular, binocular or trinocular microscope. As indicated above the motorised (or robotic) XY stage may support multiple slides. In that case the slides may be processed sequentially—for example all images for a slide obtained before capturing images of the next slide. Alternatively images for slides could be captured in parallel. For example for a given focal length, images for all of the slides could be captured. Once all images are captured they could be separated into groups of images for each slide and then analysed. The image sensor may be camera with optics that integrates with the microscope, or an image sensor such as a CMOS sensor chip and supporting electronics. The system comprises at least one computing apparatus 4 operatively connected to the sample imaging apparatus 3 and the robotic microscope platform 3. In one embodiment the at least one computing apparatus comprises a local computing apparatus 20 and a remote, web, or cloud based computing apparatus 30. Each computing apparatus comprises at least one processor and a memory operatively connected to the processor, and the computing apparatus 4 is configured to perform the method described herein.

The system is a computer implemented system comprising at least one computing apparatus 4. This computing apparatus comprises at least one processor 22, 32 and at least one memory 23, 33 operatively connected to the at least one processor (or one of the processors) and may comprises additional devices or apparatus such as a display device, and input and output devices/apparatus (the term apparatus and device will be used interchangeably). The memory may comprise instructions to cause the processor to execute a method described herein. The processor memory and display device may be included in a standard computing apparatus, such as a desktop computer, a portable computing apparatus such as a laptop computer or tablet, or they may be included in a customised apparatus or system. The computing apparatus may be a unitary computing or programmable apparatus, or a distributed apparatus comprising several components operatively (or functionally) connected via wired or wireless connections. The computing apparatus may comprise a central processing unit (CPU), comprising an Input/Output Interface, an Arithmetic and Logic Unit (ALU) and a Control Unit and Program Counter element which is in communication with input and output devices through an Input/Output Interface. The input and output devices may comprise a display, a keyboard a mouse, the robotic (or motorised) XY-stage, the sample imaging camera, and the robotic microscope camera (or image sensor). In one embodiment an OASIS-Glide XY (or XYZ) stage and controlled using an OASIS-Blue or OASIS-4i PCIE controller manufactured by Objective Imaging of Cambridge UK (http://www.objectiveimaging.com/) may be used. Other similar products may also be used.

The Input/Output Interface may also comprise a network interface and/or communications module for communicating with an equivalent communications module in another apparatus or device using a predefined communications protocol (e.g. Bluetooth, Zigbee, IEEE 802.15, IEEE 802.11, TCP/IP, UDP, etc.). A graphical processing unit (GPU) may also be included. The display apparatus may comprise a flat screen display (e.g. LCD, LED, plasma, touch screen, etc.), a projector, CRT, etc. The computing apparatus may comprise a single CPU (core) or multiple CPU's (multiple core), or multiple processors. The computing apparatus may use a parallel processor, a vector processor, or be a distributed computing apparatus including cloud based servers. The memory is operatively coupled to the processor(s) and may comprise RAM and ROM components, and may be provided within or external to the apparatus. The memory may be used to store the operating system and additional software modules or instructions. The processor(s) may be configured to load and executed the software modules or instructions stored in the memory.

In one embodiment, for example as illustrated in FIG. 14, the computing apparatus 4 comprises a local computing apparatus 20 and at least one remote computing apparatus 30. The local computing apparatus 20 is either directly connected to the sample imaging apparatus 3 and the robotic microscope platform 2, for example over a wired connector such as USB cable, or over a wireless connection according to a protocol such as Bluetooth or Wi-Fi Direct. Alternatively the local computing apparatus 20, sample imaging apparatus 3 and the robotic microscope platform 2 may form a local area network and each be connected to the same router over wired or wireless connections to allow the different apparatus to exchange messages or data.

For example as shown in FIG. 14 a local computing 20 comprises at least one processor 22 and a memory 23 and a desktop application 24, and a remote computing apparatus 30 comprises at least one processor 32 and a memory 33 and a web application 34. The local computing apparatus may be laptop and the remote computing apparatus may be a web server or cloud hosted server. The web application 34 provides the system user interface as well as licensing, user accounts, job coordination, analysis review interface, report generation, archiving functions, etc. The web application 34 and the local desktop application 14 exchange system messages 35, for example to initiate scanning jobs, or receive notifications of completed jobs. The desktop application 24 is used to control the sample imaging apparatus and robotic microscope and initiate image capture using control messages 28, and to receive captured images 29 for analysis. The received images 29 may be pre-processed by the local application and then uploaded and 29 to a master image server 36, which may be secure cloud server. An image analysis module 37, which may be a cloud based or server based analysis module performs the image analysis as described herein and provides results or outcomes to the web application 34 for reporting.

The desktop application 24 comprises a sample imaging controller module 25, a microscope controller module 26, along with supporting operations such as calibration, network communications, error reporting, and providing a local user interface to allow local control of the desktop application. The sample imaging controller module 25 sends positioning and capture commands 28 to the sample imaging apparatus 3 and receives captured macroscale images 29 from the camera 310 which are stored in master image server 36 and provided to the image analysis module 37 for quality assessment and identification of excluded regions. The microscope controller module 26 provides positioning commands 28 to the motorised stage controller 12 and the motorised Z axis focus drive 13, and initiates image capture by image sensor (or camera) 16 located at the image plane 14 of the microscope, and receives the captured magnified phase contrast images 29. These are then stored in master images server 36 and provided to the analysis module 37 for identification and counting of countable respirable fibres. In one embodiment the analysis module 37 may be provided locally as part of the desktop application. In other embodiments, the analysis module may be a distributed module, with some functionality performed on the local computing apparatus 20 and some functionality by the remote computing apparatus 30. For example image quality assessment could be provided locally and detailed image analysis provided remotely. In another embodiment the analysis of the macroscale image from the sample imaging apparatus is performed locally, and analysis of the magnified phase contrast images from the microscope is performed remotely. In another embodiment analysis of both the macroscale images and the magnified phase contrast images is performed locally. That is analysis module 37 is part of the desktop application 24. The analysed results are then serialised and sent to the web application 37, and/or the master image store 36.

The desktop and web applications are developed and built using a high level language such as C++ or JAVA and Qt v5.7 framework. In one embodiment the image analysis module 37 implements computer vision libraries such as OpenCV 3.1. In one embodiment the sample imaging apparatus 3 and the robotic microscope 2 are both controlled via respective USB connections to a local laptop computing which runs the desktop application 24. In one embodiment the robotic XY stage is an Oasis Imaging Glide-S2 motorised stage provided by Objective Imaging who also provide C++ Dynamically Linked Libraries (DLLs herein) and an Application Programming Interface (API herein). The API allows accurate position of the X-Y stage axis and of the Z focus axis. The API also provides utilities for image stitching, generation of focus maps, and predictive focusing.

The above embodiments use computer vision methods to determine a countable area of the membrane filter in the macroscale image and to identify and count the number of countable respirable fibres within a counting region of the field of view of high resolution images captured at a sample location that cover the complete depth of the membrane. In the context of this specification a computer vision method is an automated method for analysing an image based on known reference or training data sets and comprises the use of machine learning or a supervised learning method to build a classifier (or classifiers) using reference data sets including test and training sets, including deep learning methods using multiple layered classifiers and/or multiple neural nets. The classifiers may use various image processing techniques and statistical technique such as feature extraction, detection/segmentation, mathematical morphology methods, digital image processing, objection recognition, feature vectors, etc. to build up the classifier. Various algorithms may be used including linear classifiers, regression algorithms, support vector machines, neural networks, Bayesian networks, etc. Computer vision or image processing libraries provide functions which can be used to build a classifier such as Computer Vision System Toolbox, MATLAB libraries, OpenCV C++ Libraries, ccv C++ CV Libraries, or ImageJ Java CV libraries.

In one embodiment a deep learning method is used for the pixel extractor and/or feature extractor steps of the computer vision analysis. Deep learning methods use a hierarchical cascade of multiple layers of classifiers, or other feature extraction modules, where the output from a previous layer forms the input for the next layer. Typically deep learning requires a very large training set of images for training the system. For example a set of 10,000+ microscope images at 200× and 400× magnification could be used as the training set. Regions of interest (ROI) containing individual fibres, grouped fibres, and no fibres are then extracted from the images. A software tool allows humans to label regions of interest and count the fibres in an image and/or highly fibre pixels in images. For example a Human Intelligence Task (HIT) template can be provided on the Amazon Mechanical Turk marketplace to allow humans to label the regions of interest (see for example https://blog.mturk.com/tutorial-annotating-images-with-bounding-boxes-using-amazon-mechanical-turk-42ab71e5068a). These labelled images are then used to configure a deep learning training process to create one or more classifiers. A range of deep learning software libraries such as TensorFlow and Caffe can be used for deep learning implementations (for example see http://www.wolfib.com/Image-Recognition-Intro-Part-1/).

The deep learning process comprises using training data (images) to create an initial set of models/classifiers. Multiple classifiers may be created such as: a classifier able to identify individual pixels that are part of one or more countable respirable fibres; a classifier able to identify individual fibres in their entirety; and/or a classifier able to identify and estimate the number of fibres in a grouping. An iterative deep learning process is then initiated. This iterative process begins with the models/classifiers analysing input ROI images they have not previously seen (i.e. not been trained on). The performance of each classifier is assessed by comparing the fibre count and/or fibre pixel accuracy compared with the human labelled results. Alternatively the best performing models/classifiers are selected after the evaluation step, and a new set of models/classifiers are created by random changes to the best performing classifiers. The iterative deep learning steps of analyse new images, evaluate, select and modify classifiers is repeated until acceptable performance is achieved (ie passes a threshold accuracy). For example if a classifier achieves an 99.5% accuracy of count results compared to the human labelled results then the iterative deep learning process can be terminated (during the evaluation step). Once a deep learning solution is trained (ie passes a threshold accuracy), the deep learning solution can be deployed in a cloud computing environment where images captured by the microscope are sent to the deep learning solution to identify and count from ROI in the images it receives.

In the above embodiments, the sample imaging apparatus and robotic microscope are separate apparatus, and require an operator to transfer the microscope with the fixed sample to the XY stage of the microscope. In another embodiment this transfer operation could be automated or eliminated. For example the design of the microscope slide holder could be altered to allow it to be moved and automatically loaded and unloaded into the XY stage using a robotic arm or conveyor and actuators. In some embodiments a slide autoloader could be used to store pre-prepared microscope slides 40—either for loading slides into the sample imaging apparatus, the microscope or to both. The autoloader comprises a plurality of slide supports, which may be individual support trays or a cassette arrangement, a scanner to read a barcode or slide identifier and a robotic arm or similar arrangement to remove a slide and place it onto the XY stage for image capture (and to place it back in the autoloader after images are captured). The autoloader is under computer control (e.g. by the sample imaging controller module 25 and/or microscope controller module 26, or another controller) and progressively loads one or more slides onto the robotic XY stage and macroscale and/or magnified phase contrast images can then be taken. In some embodiments two autoloaders could be used—one for use with a sample imaging apparatus, and the second for use with the microscope. In this way a batch of macroscale images could be collected, and a batch of magnified images could be separately collected (at the same time). With images provided to the image analysis modules. As each batch is finished the slides from the macroscale autoloader are moved to the microscope autoloader (if the slides are loaded in a cassette then the cassette can simply be moved). This may be immediately on finishing a batch if the macroscale image analysis results (ie excluded regions known) are available, or expected to be available shortly (ie prior to a slide being loaded into the microscope), or they may be loaded as once analysis of the macroscale images is completed (ie the excluded regions are determined). The use of autoloaders allows image capture to be performed automatically on a large batch of microscope slides, and the captured images can then be sent to the computing apparatus for analysis. Further the operator skill required is much lower as they are only required to fix samples to microscope slides and place them in the autoloader (or into a cassette) for an autoloader.

In another embodiment the XY stage could be adapted to provide light and dark backgrounds to the slide, and a two optical paths provided between the microscope camera and the XY stage to allow capture of an unmagnified image of the microscope (when loaded in the XY stage), and the standard magnified optical path. Alternatively a second camera could be mounted on the robot and an optical path provided to capture an image of the microscope slide when loaded into the XY stage. For example a robotically controlled mirror could be robotically inserted into a location above the XY stage, or with a view of the XY stage to allow a macroscale image to be taken, and the mirror could then be withdrawn or moved to allow the optical path of the microscope to observe the microscope slide in the XY stage. In another embodiment a sample camera 17 with a field of view 812 is mounted to the microscope and a microscope slide holder is mounted on the robotic XY stage so that it can be moved using the motor controller. The slide controller moves a slide within the field of view 812 of the camera of the sample imaging apparatus and a macroscale image is captured, and the slide is moved into the microscope optical path to capture a plurality of magnified phase contrast images. This is illustrated in FIG. 15B in which dotted lines shows the location of a second digital camera 17 mounted adjacent the first digital camera (or image sensor) 16 in the optical path of the microscope and the field of view 812 of this second digital camera 17. The robotic XY stage can move the slide to within this field of view to capture macroscale quality assessment images. In another embodiment the microscope may have an optical path with switchable magnification stages (or switchable optical assemblies) which can be changed under computer control to allow the same image sensor to be used to capture macroscale and high resolution images. In this embodiment the switchable magnification stages (or optical assemblies) are pre-set to low resolution (e.g. 1× to 5×), and the high resolution stage is at least 40 times.

In the above embodiment the sample imaging system is configured for supporting and capturing an image of a single microscope slide and membrane filter. In another embodiment the sample imaging system is used to support multiple microscope slides. In this multiple slide embodiment, the camera may be used to capture an image of all slides in the one image, or it may sequentially capture images of each slide. This can be achieved using either a robotic stage to move the camera to a position and/or orientation to capture each slide, or the camera may be fixed and a robotic XY stage used to move each slide into the fixed field of view of the camera. Control of image capture can be performed under control of the local computing apparatus. Alternatively a dedicated microcontroller apparatus could be used.

Embodiments of the method and system described herein provide improvements for implementing the standard membrane filter method used for analysing a membrane filter obtained from an air quality monitoring apparatus for measuring airborne respirable fibre concentration. As noted above the system is particular suitable for estimating asbestos fibre concentrations, however it will be noted that the system can be adapted to be used to detect other airborne respirable fibres in air samples such as silica fibres, synthetic-mineral-fibres (SMF), wool fibres and wooden fibres. These fibres tend to have similar length to width ratios with slightly larger diameters than asbestos fibres. In each case the method can be adapted for example by obtaining a suitable set of training images containing the desired fibre for training a computer vision method such as a machine learning classifier, and/or determining suitable geometric filter parameters (or dimensions) based on typical properties of the fibres (ie distribution of sizes). Strictly the system does not positively identify the fibre type. Rather it identifies the concentration of fibres having properties similar to the desired target fibre (e.g. it identifies asbestos-like fibres). Typically these samples will be fixed on a microscope slide, but it is to be understood that the samples could be fixed on an optically transparent support such as a glass sheet, petri dish, or plastic sheet or dish, or any other suitably optically transparent support material.

The automated sample capture and analysis enables computer vision techniques to be used to assess slide quality control and detection of regions to be excluded prior to high resolution scanning. Further once scanning is underway, the robotic microscope system can rapidly acquire all required images, controlling the XY stage, Z focusing, and image capture. Images can then be sent to an analysis module which uses computer vision techniques to rapidly and reliably identify and count countable respirable fibres and generate an appropriate report. This enables automated system thus provides fast and rigorous adherence to the guidelines for implementing the standard membrane filter method compared to existing manual methods and systems. This allows higher throughput and thus reduces the operational costs enabling cheaper testing.

For example a highly skilled human operator takes between 8-30 minutes to scan and analyse up to 100 sample locations per sample, and can process 8-12 samples per day. The result uncertainty is high and inter-laboratory reliability is low, and the due to the subjectively the analysis is not repeatable. In comparison the automated system described herein can scan and analyse a sample in 1-2 minutes and can easily process 100 samples per day or more. The operator skill required is much lower as they are only required to fix samples to microscope slides and transfer the microscope slides between the sample imaging apparatus and the robotic XY stage of the microscope. Further this transfer task can be automated through the use of an autoloader, further speeding up processing time. Further the result uncertainty is comparatively lower and the inter-laboratory reliability is much higher and the analysis is repeatable. The system also provides superior traceability. Analysed images can be stored on web servers along with analysis information such as absolute positions of particles, excluded regions, quality measures, etc.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgment of any form of suggestion that such prior art forms part of the common general knowledge.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by a computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "analysing" encompasses a wide variety of actions. For example, "analysing" may include calculating, computing, processing, deriving, investigating, looking up (e.g., looking up in a table, a database or another data structure), ascertaining and the like. Also, "analysing" may include receiving (e.g., receiving information), accessing (e.g., accessing data in a memory) and the like. Also, "analysing" may include resolving, selecting, choosing, establishing and the like.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A method for automated analysis of a membrane filter obtained from an air quality monitoring apparatus used for sampling airborne respirable fibres, the method comprising
capturing at least one macroscale image of at least a sample portion of a membrane filter supported and fixed on an optically transparent support;
analysing the at least one macroscale image using a computer vision method to determine a countable area of the membrane filter and one or more excluded regions within the countable area of the membrane filter, the excluded regions comprising one or more of membrane filter grid lines, air bubbles and large particulate matter;
inserting the optically transparent support supporting the sample portion membrane filter into a robotic XY stage of a digital phase contrast microscope further comprising an image sensor configured to capture an image of the image plane of the digital phase contrast microscope;
capturing at least one magnified phase contrast image at each of N sample locations located across the countable area of the filter member using the image sensor of the digital phase contrast microscope, where N is at least 20, and the N sample locations are selected such that a field of view at each sample location does not contain an excluded region;
analysing the at least magnified one phase contrast image at each of the N sample locations using a computer vision method to identify and count the number of countable respirable fibres within a counting region of the field of view at each sample location; and
counting and reporting the total number of countable respirable fibres counted in the countable area of the membrane filter.

2. The method as claimed in claim 1, wherein analysing the at least one macroscale image using a computer vision method further comprises performing a quality assessment of the sample portion of the membrane filter against a set of predefined sample quality criteria comprising identifying one or more tears in the membrane filter, detection of a portion of the membrane filter outside of a coverslip, detection of discolouration of the membrane filter, and the percentage of the membrane covered by air bubbles exceeding a predetermined threshold value, and terminating the method if the sample fails the quality assessment.

3. The method as claimed in claim 1, wherein capturing at least one magnified phase contrast image at each of N sample locations comprises:
   a) selecting a point within the countable area;
   b) determining if the field of view contains an excluded region;
   c) if the field of view contains an excluded region, returning to step a)
   d) if the field of view does not contain an excluded region, instructing the robotic XY stage to the selected point and capturing at least one magnified phase contrast image, and incrementing a counter;
   e) returning to step a) if the counter is less than N, otherwise terminating the capturing step.

4. The method as claimed in claim 3, wherein the step of selecting a point is performed randomly.

5. The method as claimed in claim 3, wherein analysing the at least one macroscale image further comprises defining a 2D mapping grid over the countable region, and the step of selecting a point is performed by sequentially selecting a grid point in the 2D mapping grid.

6. The method as claimed in claim 1, wherein the optically transparent support is a microscope slide, and the method further comprises:
   placing the filter on the slide using a sample placement stencil located under the optically transparent support that indicates a preferred location for the filter;
   treating the filter to form a membrane filter; and
   fixing the membrane filter to the slide using a coverslip.

7. The method as claimed in claim 1, wherein the optically transparent support is a microscope slide and analysing the at least one macroscale image comprises identifying a slide boundary and defining a 2D mapping grid over the slide using predetermined known slide dimensions, identifying and storing the grid locations of a coverslip, gridlines on the membrane filter, bubbles on the membrane filter, and any other large particulate matter including dirt.

8. The method as claimed in claim 7 wherein capturing at least one macroscale image comprises capturing an image of the slide against a grey background;
   and analysing the at least one macroscale image using a computer vision method further comprises:
   analysing the image to identify a plurality of reference points on the slide, an edge of the membrane filter and a plurality of gridlines located on the membrane filter within the countable area using the 2D mapping grid; and
   analysing the image to identify the locations of air bubbles within the countable area using the 2D mapping grid.

9. The method as claimed in claim 7 wherein capturing at least one macroscale image comprises capturing at least one dark image of the slide against the dark background, and at least one light image of the slide against a light background;
   and analysing the at least one macroscale image using a computer vision method further comprises:
   analysing the at least one light image to identify a plurality of reference points on the slide, an edge of the membrane filter and a plurality of gridlines located on the membrane filter within the countable area using the 2D mapping grid by applying feature detection to the at least one light image to detect features of the slide, coverslip, membrane filter and intersections of grid line, and the detected features are used to anchor geometrical shapes to identify the edges of the coverslip, membrane filter and intersections of grid line using a tetragon shape for the coverslip, a circular arc for the membrane filter, and intersecting straight lines for the grid lines;
   analysing the at least one dark image to identify the locations of air bubbles within the countable area using the 2D mapping grid by cropping the dark image around the location of the membrane filter, applying a contrast adjustment, and fitting one or more contours to the contrast adjusted image to identify open and closed air bubbles based on contrast changes.

10. The method as claimed in claim 1, wherein the step of capturing at least one magnified phase contrast image at each of N sample locations comprises capturing, at each sample location, a set of Z magnified phase contrast images each captured at a different focal plane, and analysing the at least magnified one phase contrast image at each of the N sample locations comprises Z-stacking the set of Z magnified phase contrast images to obtain a single stacked image, and the computer vision method analyses the single stacked image to identify and count the number of countable respirable fibres within a counting region of the field of view of the single stacked image.

11. The method as claimed in claim 1, wherein the computer vision method to identify and count the number of countable respirable fibres within a counting region of the field of view at each sample location comprises:
   identifying one or more regions of interest, each region of interest comprising an object;
   applying one or more machine learning classifiers trained on a reference set of images of a respirable fibre to each region of interest to identify one or more candidate regions of interest which match a reference image;
   applying a geometric filter to each candidate region of interest to identify an object having a geometry matching the respirable fibre; and
   counting the number of countable respirable fibres.

12. The method as claimed claim 11, wherein the respirable fibres and countable respirable fibres are asbestos fibres and applying the geometric filter comprises applying a regular asbestos fibre geometric filter to each candidate region of interest using a filtering criteria requiring an object in a candidate region of interest to have a maximum width less than 3 micrometres, a length greater than 5 micrometres and a length:width ratio greater than 3:1, and which does not appear to touch any other object within the candidate region of interest, and each object satisfying the filtering criteria is counted as a single countable fibre.

13. The method as claimed in claim 12, wherein applying the geometric filter further comprises applying a bundled asbestos fibre geometric filter to each candidate region of interest using a filtering criteria requiring an object in a candidate region of interest to have a maximum width less than 3 micrometres, a length greater than 5 micrometres and a length:width ratio greater than 3:1; and which does not appear to touch any other object with a maximum width, defined as the smaller of the two dimensions of the other object, greater than 3 micrometres, and wherein counting the number of countable respirable fibres comprises counting any individually distinguishable fibres, or if no individual fibres can be distinguished then counting the bundle as a single fibre.

14. The method as claimed in claim 1, wherein the computer vision method to identify and count the number of countable respirable fibres within a counting region of the field of view further comprises performing a quality assessment of the field of view of the at least magnified one phase contrast image against a set of predefined quality criteria comprising detection of discolouration of the membrane filter, and the percentage of the counting region covered by an agglomerations of fibres and/or particles exceeding a predetermined threshold value, and terminating further analysis at the sample location if the field of view of the at least magnified one phase contrast image fails the quality assessment.

15. The method as claimed in claim 1, wherein N is between 20 and 100, and the capturing step is terminated when a total of 100 countable respirable fibres have been counted across at least 20 sample locations.

16. The method as claimed in claim 1, wherein each of the at least one magnified phase contrast image has a total magnification of between 40 times and 2000 times.

17. The method as claimed in claim 1, wherein the countable respirable fibres are asbestos fibres or synthetic mineral fibres.

18. The method as claimed in claim 1, wherein the optically transparent support is a microscope slide, and the method further comprises loading a plurality of microscope slides each supporting a sample portion membrane filter into a computer controlled autoloader configured to loads and unload one or more microscopes into the robotic XY stage, and inserting the microscope slide supporting the sample portion membrane filter into a robotic XY stage is performed using the autoloader, and wherein each microscope slide comprises a unique identifier, and the method further comprises capturing a representation of the identifier, and performing the capturing analysing and reporting steps for each loaded microscope wherein the reporting also reports the unique identifier of the microscope.

19. A system for automated analysis of a membrane filter obtained from an air quality monitoring apparatus used for sampling airborne respirable fibres, the apparatus comprising:
  a sample imaging apparatus comprising:
    at least one optically transparent support holder for receiving an optically transparent support which in use comprises a sample portion of a membrane filter;
    a sample digital camera with a field of view comprising at least a sample portion of at least one slide when located in the optically transparent support holder and configured to capture at least one macroscale image of at least a sample portion of a membrane filter;
  a robotic microscope platform comprising
    a phase contrast microscope;
    a motorised XY stage for receiving an optically transparent support;
    a motorised Z axis focus drive;
    an image sensor located in an image plane configured to capture at least one magnified phase contrast image; and
  at least one computing apparatus operatively connected to the sample imaging apparatus and the robotic microscope platform, the at least one computing apparatus comprising at least one processor and a memory operatively connected to the processor, and the computing apparatus configured to perform the method of claim 1.

20. The system as claimed in claim 19, wherein the at least one computing apparatus comprises a local computing apparatus and at least one remote computing apparatus, the local computing apparatus either directly connected to the sample imaging apparatus and the robotic microscope platform or connected on a local network and wherein the local computing apparatus is configured to perform the capturing steps and provide the captured at least one macroscale image and the at least one magnified phase contrast image at each of N sample locations to the at least one remote computing apparatus over a network connection, and the remote computing is configured to perform the analysis steps and the counting and reporting step.

21. The system as claimed in claim 19, wherein the optically transparent support holder in the sample imaging apparatus further comprises:
  a colour changing panel located in a base of the optically transparent support holder for supporting an optically transparent support, wherein the colour changing panel has a dark surface to provide a dark background for a supported optically transparent support and further comprises a switchable light source to provide a light background for the supported optically transparent support.

22. The system as claimed in claim 21 wherein the optically transparent support holder in the sample imaging apparatus further comprises:
  a sample placement stencil located on and supported by the colour changing panel and which supports the optically transparent support holder to indicate a preferred location for the membrane filter.

23. The system as claimed in claim 19, further comprising:
  a microscope autoloader for storing a plurality of microscope slides and configured to load and unload one or more microscope slides in the motorised XY stage.

24. A sample imaging apparatus comprising:
  at least one optically transparent support holder for receiving an optically transparent support which in use comprises a sample portion of a membrane filter;
  a sample digital camera with a field of view comprising at least a sample portion of at least one slide when located in the optically transparent support holder;
  at least one computing apparatus operatively connected to the sample imaging apparatus and comprising at least one processor and a memory operatively connected to the processor, and the computing apparatus configured to:
  capture at least one macroscale image of at least a sample portion of a membrane filter supported and fixed on an optically transparent support;
  analysing the at least one macroscale image using a computer vision method to determine a countable area of the membrane filter and one or more excluded regions within the countable area of the membrane filter, the excluded regions comprising one or more of membrane filter grid lines, air bubbles and large particulate matter.

25. The sample imaging apparatus as claimed in claim 24, wherein the optically transparent support holder further comprises:
  a colour changing panel located in a base of the optically transparent support holder for supporting an optically transparent support, wherein the colour changing panel has a dark surface to provide a dark background for a supported optically transparent support and further comprises a switchable light source to provide a light background for the supported optically transparent support.

26. The sample imaging apparatus as claimed in claim 24 wherein the optically transparent support holder further comprises:

a sample placement stencil located on and supported by the colour changing panel and which supports the optically transparent support holder to indicate a preferred location for the membrane filter.

* * * * *